US010740253B2

(12) United States Patent
Sisler et al.

(10) Patent No.: US 10,740,253 B2
(45) Date of Patent: Aug. 11, 2020

(54) TECHNOLOGIES FOR REMOTE DEVICE EMULATION

(71) Applicant: ABB SCHWEIZ AG, Baden (CH)

(72) Inventors: Bryan D. Sisler, Greer, SC (US); Jeffrey M. Fell, West Bend, WI (US)

(73) Assignee: ABB Schweiz AG, Baden (CH)

( * ) Notice: Subject to any disclaimer, the term of this patent is extended or adjusted under 35 U.S.C. 154(b) by 308 days.

(21) Appl. No.: 15/241,101

(22) Filed: Aug. 19, 2016

(65) Prior Publication Data
US 2017/0060784 A1 Mar. 2, 2017

Related U.S. Application Data

(60) Provisional application No. 62/210,200, filed on Aug. 26, 2015.

(51) Int. Cl.
G06F 13/10 (2006.01)
H04L 29/06 (2006.01)
H04L 29/08 (2006.01)

(52) U.S. Cl.
CPC .......... G06F 13/107 (2013.01); H04L 67/125 (2013.01); H04L 69/08 (2013.01)

(58) Field of Classification Search
CPC ..... G06F 13/107; H04L 67/125; H04L 69/08; H04L 67/08
See application file for complete search history.

(56) References Cited

U.S. PATENT DOCUMENTS

| 5,218,683 | A | * | 6/1993 | Jerrim | G06F 13/126 710/105 |
| 5,490,134 | A | * | 2/1996 | Fernandes | H04L 29/06 340/3.1 |
| 7,602,782 | B2 | * | 10/2009 | Doviak | H04L 12/5692 370/389 |

(Continued)

OTHER PUBLICATIONS

Wikipedia contributors. "Word (computer architecture)." [web] Wikipedia, The Free Encyclopedia. (Jun. 2018) [retrieved on Aug. 11, 2018]. Retrieved from <https://en.wikipedia.org/wiki/Word_(computer_architecture)> (Year: 2018).*

Primary Examiner — Rehana Perveen
Assistant Examiner — Alfred H B Wechselberger
(74) Attorney, Agent, or Firm — Barnes & Thornburg LLP

(57) ABSTRACT

Technologies for facilitating communication between a master programmable logic controller and one or more target drives are disclosed. In an illustrative embodiment, a remote device emulation appliance is configured to receive a communication from a master programmable logic controller that is formatted according to a remote input/output protocol unusable by the target drive. The remote device emulation appliance converts the communication from the remote input/output protocol to a drive protocol usable by the target drive to control operations of the drive and transmits the converted communication to the target drive. The remote device emulation appliance may also convert communications received from the target drive from the drive protocol usable by the target drive to the remote input/output protocol and transmit such converted communications to the master programmable logic controller.

24 Claims, 13 Drawing Sheets

(56) References Cited

U.S. PATENT DOCUMENTS

| | | | | |
|---|---|---|---|---|
| 7,987,489 | B2* | 7/2011 | Krzyzanowski | H04L 12/2814 |
| | | | | 725/80 |
| 9,401,839 | B2* | 7/2016 | Kidwell | H04L 41/0226 |
| 2006/0036799 | A1* | 2/2006 | Shah | G06F 8/38 |
| | | | | 711/100 |
| 2006/0248208 | A1* | 11/2006 | Walbeck | H04L 29/06 |
| | | | | 709/230 |
| 2007/0019641 | A1* | 1/2007 | Pai | H04L 29/06 |
| | | | | 370/389 |
| 2007/0067458 | A1* | 3/2007 | Chand | G06F 16/258 |
| | | | | 709/226 |
| 2007/0074280 | A1* | 3/2007 | Callaghan | H04L 63/029 |
| | | | | 726/12 |
| 2007/0079028 | A1* | 4/2007 | Hall | G05B 19/4186 |
| | | | | 710/62 |
| 2010/0123420 | A1* | 5/2010 | Campbell | H02P 31/00 |
| | | | | 318/558 |
| 2014/0121789 | A1* | 5/2014 | Brandes | G05B 23/027 |
| | | | | 700/80 |
| 2015/0103655 | A1* | 4/2015 | Yu | H04W 28/22 |
| | | | | 370/230 |
| 2016/0016096 | A1* | 1/2016 | Fisher | G05B 19/0421 |
| | | | | 700/90 |
| 2016/0084076 | A1* | 3/2016 | Fanini | E21B 47/12 |
| | | | | 340/853.1 |

* cited by examiner

FIG. 10

Compatibility Settings

- Hz Display
- RPM Display

| | Drive 1 (AX100) | Drive 2 (AX200) | Drive 3 | Drive 4 | Drive 5 | Drive 6 |
|---|---|---|---|---|---|---|
| 1202 → | Stop Mode<br>Ramp To Stop ▾ | Stop Mode<br>Ramp To Stop ▾ | Stop Mode | Stop Mode | Stop Mode | Stop Mode |
| 1204 → | Logic Control<br>Normal ▾ | Logic Control<br>Normal ▾ | Logic Control | Logic Control | Logic Control | Logic Control |
| 1206 → | JOG Frequency<br>0.000000      Hz | JOG Frequency<br>0.000000      Hz | JOG Frequency<br>Hz | JOG Frequency<br>Hz | JOG Frequency<br>Hz | JOG Frequency<br>Hz |
| 1208 → | MOP Increment<br>0.000000      Hz | MOP Increment<br>0.000000      Hz | MOP Increment<br>Hz | MOP Increment<br>Hz | MOP Increment<br>Hz | MOP Increment<br>Hz |
| 1210 → | MOP Reference<br>0.000000      Hz | MOP Reference<br>0.000000      Hz | MOP Reference<br>Hz | MOP Reference<br>Hz | MOP Reference<br>Hz | MOP Reference<br>Hz |
| 1212 → | Local Adapter ID<br>0 | Local Adapter ID<br>0 | Local Adapter ID | Local Adapter ID | Local Adapter ID | Local Adapter ID |
| 1214 → | Reference Scaling Coefficient<br>RIO value 32767 =<br>30.00      Hz | Reference Scaling Coefficient<br>RIO value 32767 =<br>30.00      Hz | Reference Scaling Coefficient<br>RIO value 32767 =<br>Hz | Reference Scaling Coefficient<br>RIO value 32767 =<br>Hz | Reference Scaling Coefficient<br>RIO value 32767 =<br>Hz | Reference Scaling Coefficient<br>RIO value 32767 =<br>Hz |

FIG. 12

TECHNOLOGIES FOR REMOTE DEVICE EMULATION

CROSS-REFERENCE TO RELATED APPLICATION

This application claims the benefit of U.S. Provisional Patent Application Ser. No. 62/210,200, filed Aug. 26, 2015, the entire disclosure of which is incorporated by reference herein.

BACKGROUND

Programmable logic controllers are computer systems used in a variety of applications to control automation of various machines. For example, programmable logic controllers are often used in industrial applications, such as assembly lines or other processes, to control the operation of motors, actuators, robotic machines, and other output devices. Additionally, to facilitate the control of such machines, programmable logic controllers are often coupled to an array of sensors to receive various sensor data, which may provide an amount of closed loop feedback for the control of the various machines. Due to the often harsh environment of the typical applications in which programmable logic controller are used, most programmable logic controllers are designed and built to operate in severe conditions (e.g., excessive dirt, heat, cold, vibrations, etc.)

Typical programmable logic controllers control the operation of the associated output devices based on a software program. As the name suggests, the software programs executed by programmable logic controllers may be modified or updated to customize the programmable logic controller for a specific purpose or adjust for new or different output devices, sensors, and/or other devices controlled by or otherwise in communication with the programmable logic controller.

Although programmable logic controllers are reprogrammable, modification of the software program can be difficult and time extensive. Such difficulty increases over time as the programmable logic controller becomes coupled to additional output devices, input sensors, and other logic controllers. Additionally, an owner's knowledge of the original software program may diminish or become nonexistent over time. As such, it can become difficult to update components of a control system. For example, updating a legacy output device with a newer output device, which may use different communication format and/or protocol relative to the legacy output device, may require the software program executed by the programmable logic controller to be redesigned to successfully communicate with the new output device. As mentioned above, such reprogramming can be costly and take a significant amount of time during which the assembly line or other industrial application is non-operative resulting in additional losses for the company or owner.

SUMMARY

According to one aspect, a method for facilitating communication between a master programmable logic controller and a target drive may include receiving, by a remote device emulation appliance, a first communication from the master programmable logic controller over a remote input/output communication link, wherein the first communication is formatted according to a remote input/output protocol unusable by the target drive; converting, by the remote device emulation appliance, the first communication from the remote input/output protocol to a drive protocol usable by the target drive; and transmitting, by the remote device emulation appliance, the converted communication to the target drive to control an operation of the target drive.

In some embodiments, receiving the first communication may include receiving, by the remote device emulation appliance, a communication from a remote input/output scanner of the master programmable logic controller. Additionally, in some embodiments, converting the first communication may include converting, by the remote device emulation appliance, the communication from a remote input/output protocol configured for use by a legacy drive to the drive protocol usable by the target drive.

In some embodiments, converting the first communication may include converting, by the remote device emulation appliance, a format of a control word included in the first communication from a legacy drive format usable by a legacy drive to a target drive format usable by the target drive. In such embodiments, converting the first communication may include retrieving, by the remote device emulation appliance, communication conversion data and converting the format of the control word from the legacy drive format to the target drive format based on the communication conversion data. The communication conversion data may define a set of rules for converting the format of the control word to the target drive format. Additionally, in such embodiments, converting the format of the control word may include generating a converted control word based on the target drive format and transmitting the converted communication may include transmitting the converted control work to the target drive.

In some embodiments, converting the first communication may include converting, by the remote device emulation appliance, drive operational parameters included in the communication from a legacy drive format usable by a legacy drive to a target drive format usable by the target drive. In such embodiments, converting the first communication may include retrieving, by the remote device emulation appliance, communication conversion data and converting the drive operational parameters from the legacy drive format to the target drive format based on the communication conversion data. The communication conversion data may define a set of rules for converting the drive operational parameters to the target drive format. Additionally, in such embodiments, converting the drive operational parameters may include generating converted drive operational parameters based on the target drive format and transmitting the converted communication may include transmitting the converted drive operational parameters to the target drive.

In some embodiments, the converted communication may include a first converted communication and the method may also include receiving, by the remote device emulation appliance, a second communication from the target drive in response to the first converted communication, wherein the second communication is formatted according to the drive protocol; converting, by the remote device emulation appliance, the second communication from the drive protocol to the remote input/output protocol; and transmitting the converted second communication to the master programmable logic controller. In such embodiments, converting the second communication may include converting, by the remote device emulation appliance, a format of a status word included in the second communication from a target drive format usable by the target drive to a legacy drive format usable by a legacy drive. Additionally, in such embodiments, converting the second communication may include retrieving, by the remote device emulation appliance, communication conversion data and converting the format of the status word from the target drive format to the legacy drive format based on the communication conversion data. The communication conversion data may define a set of rules for converting the format of the status word to the legacy drive format. In such embodiments, converting the format of the status word may include generating a converted status word based on the legacy drive format and transmitting the converted second communication may include transmitting the converted status word to the master programmable logic controller. Additionally, in such embodiments, converting the second communication may include converting, by the remote device emulation appliance, drive operational parameters included in the second communication from a target drive format usable by the target drive to a legacy drive format usable by a legacy drive. In those embodiments, converting the second communication may include retrieving, by the remote device emulation appliance, communication conversion data and converting the drive operational parameters from the target drive format to the legacy drive format based on the communication conversion data. The communication conversion data may define a set of rules for converting the format of the drive operational parameters to the legacy drive format. Additionally, in such embodiments, converting the drive operational parameters may include generating converted drive operational parameters based on the legacy drive format and transmitting the converted second communication may include transmitting the converted drive operational parameters to the master programmable logic controller.

Additionally, in some embodiments, the method may also include receiving, by the remote device emulation appliance, an alias name for the target drive from a user of the remote device emulation appliance and setting, by the remote device emulation appliance, a name of the target drive to the alias name. Additionally, the method may include receiving, by the remote device emulation appliance, a selection of a type of the target drive; retrieving, by the remote device emulation appliance, configuration data from a data storage of the remote device emulation appliance, the configuration data comprising default settings for drive operational parameters of the target drive; and setting, by the remote device emulation appliance and in response to the selection, the drive operational parameters of the target drive based on the configuration data. Additionally or alternatively, the method may include receiving, by the remote device emulation appliance, a selection of a type of the target drive; receiving, by the remote device emulation appliance, configuration data from a user of the remote device emulation appliance, the configuration data comprising settings for drive operational parameters of the target drive; and setting, by the remote device emulation appliance, the drive operational parameters of the target drive based on the received configuration data. In such embodiments, the method may further include determining, by the remote device emulation appliance, whether each of the set drive operational parameters is valid and visually identifying a first drive operational parameter of the set drive operational parameters in response to a determination that the first drive operational parameter is invalid.

In some embodiments, the method may also include receiving, by the remote device emulation appliance, a selection of a legacy drive to be emulated by the target drive and retrieving, by the remote device emulation appliance, communication conversion data based on the selected legacy drive, wherein the communication conversion data defines conversion parameters for converting a communication from a legacy drive format useable by the legacy drive to a target drive format usable by the target drive. In such embodiments, the communication conversion data may include control word format conversion parameters to convert a control word format from the legacy drive format to the target drive format and status word format conversion parameters to convert a status word format from the legacy drive format to the target drive format. Additionally, in such embodiments, the method may further include receiving, by the remote device emulation appliance, user-defined conversion parameters from a user and setting, by the remote device emulation appliance, configurable conversion parameters of the communication conversion data based on the user-defined conversion parameters.

According to another aspect, a remote device emulation appliance for facilitating communication between a master programmable logic controller and a drive may include a communication circuitry and a communication conversion circuitry. The communication circuitry may be configured to receive a first communication from the master programmable logic controller over a remote input/output communication link, wherein the first communication is formatted according to a remote input/output protocol unusable by the target drive. The communication conversion circuitry may be configured to convert the first communication from the remote input/output protocol to a drive protocol usable by the target drive. Additionally, the communication circuitry may be configured to transmit the converted communication to the target drive to control an operation of the target drive.

In some embodiments, the communication circuitry may be configured to receive the first communication from a remote input/output scanner of the master programmable logic controller. Additionally, in some embodiments, to convert the first communication may include to convert the first communication from a remote input/output protocol configured for use by a legacy drive to the drive protocol usable by the target drive. In some embodiments, to convert the first communication may include to convert a format of a control word included in the first communication from a legacy drive format usable by a legacy drive to a target drive format usable by the target drive. In such embodiments, the communication conversion circuitry may be configured to retrieve communication conversion data and convert the format of the control word from the legacy drive format to the target drive format based on the communication conversion data, wherein the communication conversion data defines a set of rules for converting the format of the control word to the target drive format. Additionally, in such embodiments, to convert the format of the control word may include to generate a converted control word based on the target drive format and to transmit the converted communication may include to transmit the converted control work to the target drive.

Additionally, in some embodiments, to convert the first communication may include to convert drive operational parameters included in the communication from a legacy drive format usable by a legacy drive to a target drive format usable by the target drive. In such embodiments, to convert the first communication may include to retrieve communication conversion data and convert the drive operational parameters from the legacy drive format to the target drive format based on the communication conversion data, and the communication conversion data may define a set of rules for converting the drive operational parameters to the target drive format. Additionally, in such embodiments, to convert the drive operational parameters may include to generate converted drive operational parameters based on the target drive format and to transmit the converted communication may include to transmit the converted drive operational parameters to the target drive.

In some embodiments, the converted communication may include a first converted communication. In such embodiments, the communication circuitry may be configured to receive a second communication from the target drive in response to the first converted communication, wherein the second communication is formatted according to the drive protocol, the communication conversion circuitry may be configured to convert the second communication from the drive protocol to the remote input/output protocol, and the communication circuitry may be further configured to transmit the converted second communication to the master programmable logic controller. Additionally, in such embodiments, to convert the second communication may include to convert a format of a status word included in the second communication from a target drive format usable by the target drive to a legacy drive format usable by a legacy drive. Further, in such embodiments, to convert the second communication may include to retrieve communication conversion data and convert the format of the status word from the target drive format to the legacy drive format based on the communication conversion data, and the communication conversion data may define a set of rules for converting the format of the status word to the legacy drive format. Additionally, in such embodiments, t convert the format of the status word may include to generate a converted status word based on the legacy drive format and to transmit the converted second communication may include to transmit the converted status word to the master programmable logic controller. Additionally, to convert the second communication may include to convert drive operational parameters included in the second communication from a target drive format usable by the target drive to a legacy drive format usable by a legacy drive. In such embodiments, to convert the second communication may include to retrieve communication conversion data and convert the drive operational parameters from the target drive format to the legacy drive format based on the communication conversion data, and the communication conversion data may define a set of rules for converting the format of the drive operational parameters to the legacy drive format. Additionally, in such embodiments, to convert the drive operational parameters may include to generate converted drive operational parameters based on the legacy drive format and to transmit the converted second communication may include to transmit the converted drive operational parameters to the master programmable logic controller.

Additionally, in some embodiments, the remote device emulation appliance may further include an initialization circuitry configured to receive an alias name for the target drive from a user of the remote device emulation appliance and set a name of the target drive to the alias name. Additionally, in some embodiments, the remote device emulation appliance may further include an initialization circuitry configured to receive a selection of a type of the target drive; retrieve configuration data from a data storage of the remote device emulation appliance, the configuration data comprising default settings for drive operational parameters of the target drive; and set, in response to the selection, the drive operational parameters of the target drive based on the configuration data. Additionally or alternatively, the remote device emulation appliance may further include an initialization circuitry configured to receive a selection of a type of the target drive; receive configuration data from a user of the remote device emulation appliance, the configuration data comprising settings for drive operational parameters of the target drive; and set the drive operational parameters of the target drive based on the received configuration data.

In some embodiments, the remote device emulation appliance may also a validation circuitry configured to determine whether each of the set drive operational parameters is valid and visually identify a first drive operational parameter of the set drive operational parameters in response to a determination that the first drive operational parameter is invalid. Additionally, in some embodiments, the remote device emulation appliance may further an initialization circuitry configured to receive a selection of a legacy drive to be emulated by the target drive and retrieve communication conversion data based on the selected legacy drive, and the communication conversion data may define conversion parameters for converting a communication from a legacy drive format useable by the legacy drive to a target drive format usable by the target drive. In such embodiments, the communication conversion data may include control word format conversion parameters to convert a control word format from the legacy drive format to the target drive format and status word format conversion parameters to convert a status word format from the legacy drive format to the target drive format. Additionally, in such embodiments, the initialization circuitry may be further configured to receive, user-defined conversion parameters from a user and set configurable conversion parameters of the communication conversion data based on the user-defined conversion parameters.

According to a further aspect, one or more non-transitory, machine-readable storage media comprising a plurality of instructions stored thereon that, in response to execution, may cause a remote device emulation appliance to receive a first communication from a master programmable logic controller over a remote input/output communication link, wherein the first communication is formatted according to a remote input/output protocol unusable by the target drive; convert the first communication from the remote input/output protocol to a drive protocol usable by the target drive; and transmit the converted communication to the target drive to control an operation of the target drive.

In some embodiments, to receive the first communication may include to receive the first communication from a remote input/output scanner of the master programmable logic controller. Additionally, in some embodiments, to convert the first communication may include to convert the first communication from a remote input/output protocol configured for use by a legacy drive to the drive protocol usable by the target drive. Additionally or alternatively, to convert the first communication may include to convert a format of a control word included in the first communication from a legacy drive format usable by a legacy drive to a target drive format usable by the target drive. In such embodiments, to convert the first communication may include to retrieve communication conversion data and convert the format of the control word from the legacy drive format to the target drive format based on the communication conversion data, wherein the communication conversion data defines a set of rules for converting the format of the control word to the target drive format. Additionally, in such embodiments, to convert the format of the control word may include to generate a converted control word based on the target drive format and to transmit the converted communication may include to transmit the converted control work to the target drive.

Additionally, in some embodiments, to convert the first communication may include to convert drive operational parameters included in the communication from a legacy drive format usable by a legacy drive to a target drive format usable by the target drive. In such embodiments, to convert the first communication may include to retrieve communication conversion data and convert the drive operational parameters from the legacy drive format to the target drive format based on the communication conversion data, wherein the communication conversion data defines a set of rules for converting the drive operational parameters to the target drive format. Additionally, in such embodiments, to convert the drive operational parameters may include to generate converted drive operational parameters based on the target drive format and to transmit the converted communication may include to transmit the converted drive operational parameters to the target drive.

In some embodiments, the converted communication may include a first converted communication. In such embodiments, the plurality of instructions may further cause the remote device emulation appliance to receive a second communication from the target drive in response to the first converted communication, wherein the second communication is formatted according to the drive protocol, convert the second communication from the drive protocol to the remote input/output protocol, and transmit the converted second communication to the master programmable logic controller. Additionally, in such embodiments, to convert the second communication may include to convert a format of a status word included in the second communication from a target drive format usable by the target drive to a legacy drive format usable by a legacy drive. Further, in such embodiments, to convert the second communication may include to retrieve communication conversion data and convert the format of the status word from the target drive format to the legacy drive format based on the communication conversion data, and the communication conversion data may define a set of rules for converting the format of the status word to the legacy drive format. Additionally or alternatively, in such embodiments, to convert the format of the status word may include to generate a converted status word based on the legacy drive format and to transmit the converted second communication may include to transmit the converted status word to the master programmable logic controller. Additionally, to convert the second communication may include to convert drive operational parameters included in the second communication from a target drive format usable by the target drive to a legacy drive format usable by a legacy drive. In such embodiments, to convert the second communication may include to retrieve communication conversion data and convert the drive operational parameters from the target drive format to the legacy drive format based on the communication conversion data, and the communication conversion data may define a set of rules for converting the format of the drive operational parameters to the legacy drive format. Further, in such embodiments, to convert the drive operational parameters may include to generate converted drive operational parameters based on the legacy drive format and to transmit the converted second communication may include to transmit the converted drive operational parameters to the master programmable logic controller.

Additionally, in some embodiments, the plurality of instructions may further cause the remote device emulation appliance to receive an alias name for the target drive from a user of the remote device emulation appliance and set a name of the target drive to the alias name. Additionally or alternatively, the plurality of instructions may further cause the remote device emulation appliance to receive a selection of a type of the target drive; retrieve configuration data from a data storage of the remote device emulation appliance, the configuration data comprising default settings for drive operational parameters of the target drive; and set, in response to the selection, the drive operational parameters of the target drive based on the configuration data. Additionally or alternatively, the plurality of instructions may further cause the remote device emulation appliance to receive a selection of a type of the target drive; receive configuration data from a user of the remote device emulation appliance, the configuration data comprising settings for drive operational parameters of the target drive; and set the drive operational parameters of the target drive based on the received configuration data. In such embodiments, the plurality of instructions may further cause the remote device emulation appliance to determine whether each of the set drive operational parameters is valid and visually identify a first drive operational parameter of the set drive operational parameters in response to a determination that the first drive operational parameter is invalid.

In some embodiments, the plurality of instructions may also cause the remote device emulation appliance to receive a selection of a legacy drive to be emulated by the target drive and retrieve communication conversion data based on the selected legacy drive, and the communication conversion data may define conversion parameters for converting a communication from a legacy drive format useable by the legacy drive to a target drive format usable by the target drive. In such embodiments, the communication conversion data may include control word format conversion parameters to convert a control word format from the legacy drive format to the target drive format and status word format conversion parameters to convert a status word format from the legacy drive format to the target drive format. Additionally, in such embodiments, the plurality of instructions further cause the remote device emulation appliance to receive, user-defined conversion parameters from a user and set configurable conversion parameters of the communication conversion data based on the user-defined conversion parameters.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 7-10 are illustrative screenshots of a user interface that may be generated by the remote device emulation appliance of FIGS. 2 and 3 during execution of the method of FIGS. 4-6;

FIG. 12 is an illustrative screenshot of a user interface that may be generated by the remote device emulation appliance of FIGS. 2 and 3 during execution of the method of FIG. 11.

DETAILED DESCRIPTION OF THE DRAWINGS

Figure 1:
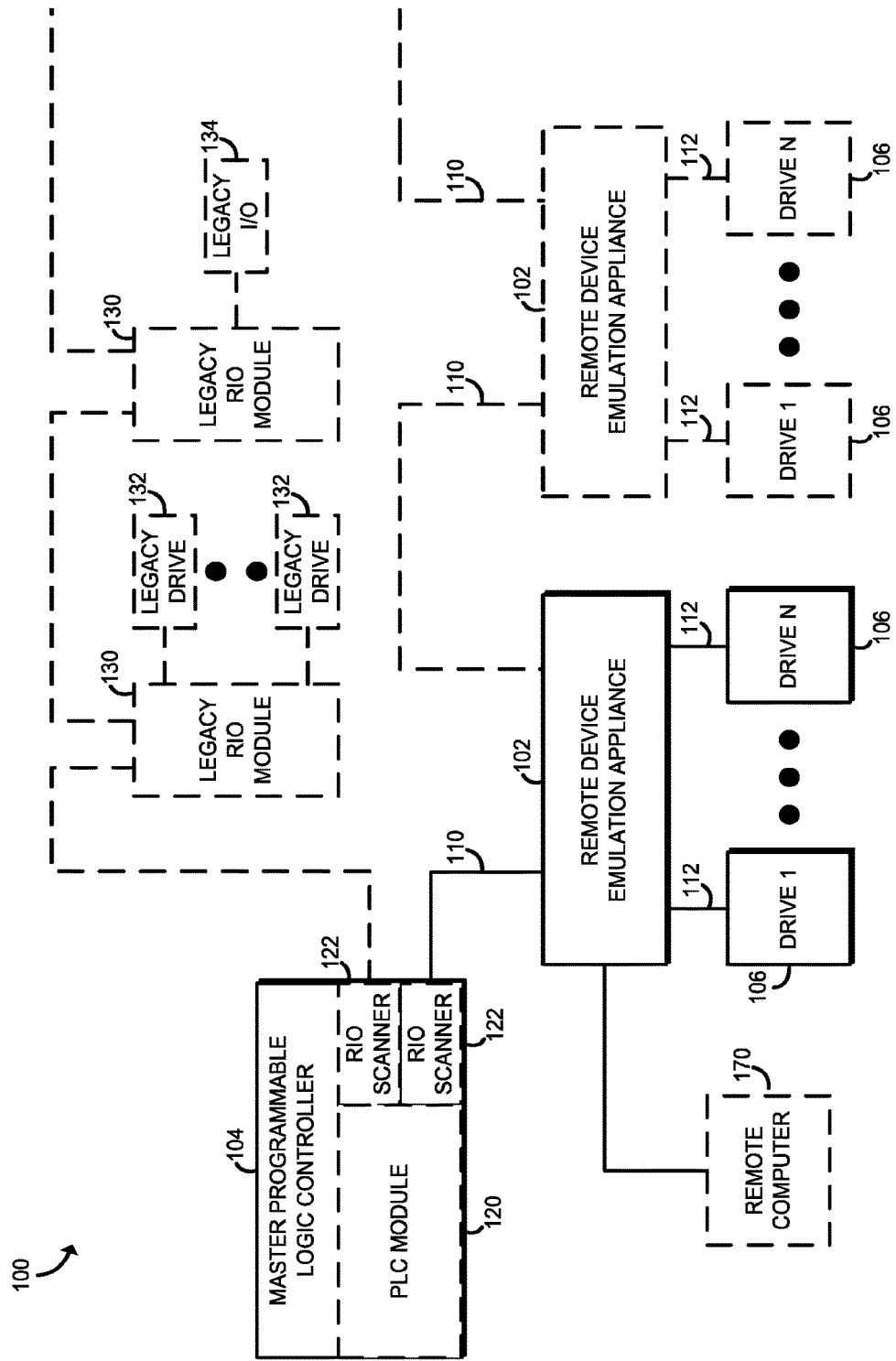
FIG. 1 is a simplified block diagram of at least one embodiment of a control system for controlling operation of industrial drives.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for controlling operation of a number of industrial drives includes one or more remote device emulation appliances 102, a master programmable logic controller (PLC) 104, and one or more drives 106 managed or controlled by a respective remote device emulation appliance 102. The remote device emulation appliance 102 is communicatively coupled to the master programmable logic controller 104 via a remote input/output communication link 110 and to each managed drive 106 via a corresponding control link 112. In use, the remote device emulation appliance 102 is configured to convert communications between the master programmable logic controller 104 and each drive 106 to facilitate control of the corresponding drive 106. As such, newer drives 106 and/or drives 106 not configured for use with the master programmable logic controller 104, and the control software program executed by the controller 104, may be used with the master programmable logic controller 104 without the requirement of reprogramming the controller 104.

As discussed in more detail below, the remote device emulation appliance 102 may be configured to emulate a legacy drive (e.g., an older drive for which the master programmable logic controller 104 is currently programmed to control) by converting the various communications. The drive emulation performed by the remote device emulation appliance 102 may allow the use of newer drives 106 having advanced features and/or functionality to be used in the system 100 without rewiring or reprogramming of the master programmable logic controller 104 and the system 100. In some embodiments, for example, the remote device emulation appliance 102 may be configured to convert a communication received from the master programmable logic controller 104 from a remote input/output protocol usable by a legacy drive to a drive protocol usable by a target drive 106 to which the communication is directed. Additionally or alternatively, the remote device emulation appliance 102 may be configured to convert communications received from the target drive 106 from the drive protocol usable by the target drive 106 to a remote input/output protocol usable by the legacy drive for transmission to the master programmable logic controller 104. For example, the remote device emulation appliance 102 may convert a format of a control word of a communication received from the master programmable logic controller 104 from a legacy drive format usable by a legacy drive to a drive format usable by the target drive 106. Similarly, the remote device emulation appliance 102 may convert a format of a status word of a communication received from a target drive 106 from the drive format usable by the target drive 106 to the legacy drive format usable by a legacy drive. In a similar manner, the remote device emulation appliance 102 may convert drive operational parameters for controlling a target drive 106 from the legacy drive format to the drive format usable by the target drive 106 and/or from the drive format to the legacy drive format as discussed in more detail below.

Figure 2:
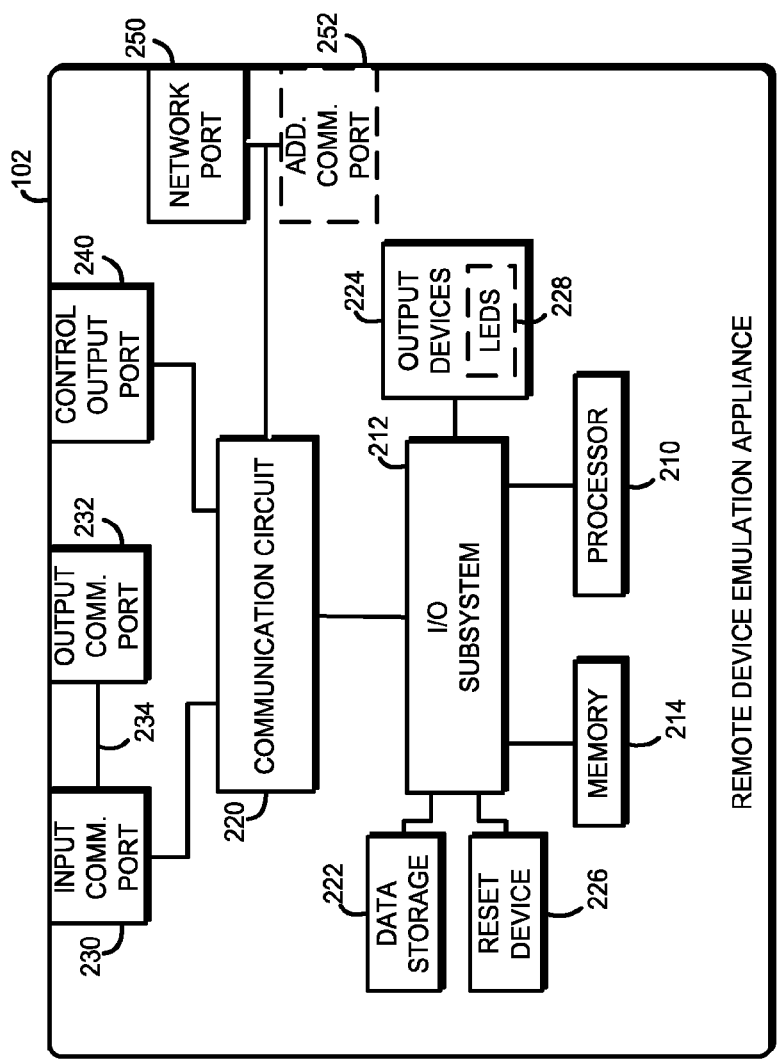
FIG. 2 is a simplified block diagram of at least one embodiment of a remote device emulation appliance of the system of FIG. 1.

The remote device emulation appliance 102 may be embodied as any type of PLC communication device, network appliance, or other computing device capable of converting communications and performing the functions described herein. As shown in FIG. 2, the illustrative remote device emulation appliance 102 includes a processor 210, an I/O subsystem 212, a memory 214, a communication circuit 220, a data storage 222, one or more output devices 224, a reset device 226, an input communication port 230, output communication port 232, a control output port 240, and a network port 250. Of course, the remote device emulation appliance 102 may include other or additional components, such as those commonly found in a network appliance (e.g., various input/output devices), in other embodiments. Additionally, in some embodiments, one or more of the illustrative components may be incorporated in, or otherwise form a portion of, another component. For example, the memory 214, or portions thereof, may be incorporated in the processor 210 in some embodiments The processor 210 may be embodied as any type of processor capable of performing the functions described herein. For example, the processor 210 may be embodied as a single or multi-core processor(s), a single or multi-socket processor, a digital signal processor, a microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the remote device emulation appliance 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the remote device emulation appliance 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the remote device emulation appliance 102, on a single integrated circuit chip.

The communication circuit 220 may be embodied as any communication circuit, device, or collection thereof, capable of enabling communications between the remote device emulation appliance 102 and the master programmable logic controller 104 and the drives 106, as well as other appliances 102 and/or remote computing devices 170 (see FIG. 2) as discussed in more detail below. To do so, the communication circuit 220 may be configured to use any one or more communication technology and associated protocols (e.g., Ethernet, Bluetooth®, Wi-Fi®, WiMAX, etc.) to effect such communication, including wired and/or wireless communication technology and associated protocols.

The data storage 222 may be embodied as any type of device or devices configured for the short-term or long-term storage of data. For example, the data storage 222 may include any one or more memory devices and circuits, memory cards, hard disk drives, solid-state drives, or other data storage devices. In the illustrative embodiment, the data storage 222 stores a communication conversion database 320 (see FIG. 3). The communication conversion database 320 includes a set of rules or definitions usable by the remote device emulation appliance 102 to convert communications from the remote input/output protocol (e.g., a legacy drive protocol) to the drive protocol usable by the drives 106 and/or from the drive protocol usable by the drives 106 to the remote input/output protocol (e.g., the legacy drive protocol). For example, the communication conversion database 320 may include conversion rules for converting a control word, a status word, and/or drive operational parameters from one format (e.g., the legacy drive protocol or the drive protocol usable by the drives 106) to another format (e.g., to the drive protocol usable by the drives 106 or the legacy drive protocol). It should be appreciated that the communication conversion database 320 may include multiple sets of rules for different types of drives 106 to facilitate the addition of new drive types to the system 100.

The output devices 224 may include any number and type of output devices capable of providing information to a user of the remote device emulation appliance 102. For example, the output devices 224 may be embodied as visual, audible, and/or tactile output devices. In the illustrative embodiment, the output devices 224 include one or more light emitting diodes 228 configured to provide visual information to the user. Of course, in other embodiments, other types of visual, audible, and/or tactile output devices may be used such as a display screen or audible alert device.

The reset device 226 may be embodied as any type of user-selectable device, such as a push-button switch, a toggle switch, or other switch or device. In use, a user of the remote device emulation appliance 102 may activate the reset device 226 to cause the remote device emulation appliance 102 to reset various options to default settings. For example, activation of the reset device 226 may cause the remote device emulation appliance 102 to set the communication conversion data used to convert communications to a default set of conversion rules and/or drive operational parameters. In this way, a user of the remote device emulation appliance 102 may reset the appliance 102 to safe, factory default values in the event that the remote device emulation appliance 102 is inadvertently set to erroneous or adverse settings.

The input communication port 230 is configured for connection to the remote input/output communication link 110 to facilitate communications with the master programmable logic controller 104. In the illustrative embodiment, the input communication port 230 is embodied as a 3-wire Remote Input/Output (RIO) terminal block configured for connection to a 3-wire remote input/output communication link 110. Of course, the input communication port 230 may have a different structure and/or features in other embodiments based on the type and features of the remote input/output communication link 110 and communication modality of the master programmable logic controller 104.

The input communication port 230 is also communicatively coupled to the output communication port 232 via a communication interconnect 234. The interconnection of the ports 230, 232 allow connection of multiple remote device emulation appliances in a daisy-chain manner using additional remote input/output communication links 110. For example, as shown in FIG. 1, the leftmost remote device emulation appliance 102 has an input communication port 230 communicatively coupled to the master programmable logic controller 104 via the remote input output communication link 110 and an output communication port 232 communicatively coupled to another remote device emulation appliance 102 via another remote input output communication link 110. Although not shown in FIG. 1, additional remote device emulation appliances 102 may be coupled in such manner to facilitate the control of additional drives 106. Similar to the input communication port 230, the output communication port 232 is illustratively embodied as a 3-wire Remote Input/Output (RIO) terminal block configured for connection to a 3-wire remote input/output communication link 110.

The control output port 240 is configured for connection to one or more drives 106 to control the operation of the drives 106. In the illustrative embodiment, the control output port 240 is embodied as an RS-232 terminal block for connection to a control link 112. In some embodiments, one or more adapters may be used in conjunction with the control output port 240 depending on the structure and functionality of the control link 112. Additionally, as shown in FIG. 1, the control output port 240 may be coupled to multiple drives 106. For example, in the illustrative embodiment, up to six drives 106 may be coupled to the control output port 240.

The network port 250 is configured for connection to a remote computer 170 as shown in FIG. 1 to facilitate configuration of the remote device emulation appliance 102 as discussed in more detail below. In the illustrative embodiment, the network port 250 is embodied as an Ethernet port configured to mate with RJ-45 type connectors. Of course, the network port 250 may be embodied as other types of communication ports configured to mate with different connectors in other embodiments based on the particular communication protocol to be used. In the illustrative embodiment, the remote device emulation appliance 102 includes a single network port 250; however, in other embodiments, the remote device emulation appliance 102 may include additional communication ports 252, which may be similar or different from the network port 250.

Referring back to FIG. 1, the master programmable logic controller 104 may be embodied as any type of programmable logic controller configured for remote input/output operation. In the illustrative embodiment, the master programmable logic controller 104 includes a programmable logic controller module 120 and one or more RIO scanner modules 122. Of course, in other embodiments, the master programmable logic controller 104 may include additional or other modules and/or devices. For example, in some embodiments, the master programmable logic controller 104 may include multiple ports for receiving various modules, such as additional scanner modules, control modules, and/or the other PLC modules.

The programmable logic controller module 120 may be embodied as any type of programmable logic controller capable of controlling industrial drives. Similarly, the RIO scanners 122 may be embodied as any type of remote I/O scanners capable of transmitting and receiving communications from remote input/output modules, including the remote device emulation appliance 102. As discussed above, the master programmable logic controller 104 (i.e., the PLC module 120) may be programmed and configured for controlling legacy drives and/or drives of a type different from the drives 106. For example, the top-most RIO scanner 122 of the illustrative master programmable logic controller 104 may be communicatively coupled to one or more legacy RIO modules 130, which may control one or more legacy drives 132 and/or legacy input/output devices 134. That is, the master programmable logic controller 104 is programmed and configured to communicate with the legacy drives 132; however, the remote device emulation appliance 102 allows the master programmable logic controller 104 to also communicate with the drives 106 as discussed in more detail below. As such, newer or different drives (i.e., the drives 106) may be added to the system 100 without the reprogramming of the master programmable logic controller 104 and without reconfiguring the system 100. As such, the system 100 may include legacy drives 132 and newer or different drives 106. It should be appreciated that the term "legacy drive" as used herein may refer to drives manufactured during a time period prior to the manufacture of the drives 106, drives that are no longer supported by their corresponding manufacturer, and/or drives that are otherwise different from the drives 106 (e.g., different manufacturer or different type).

Figure 3:
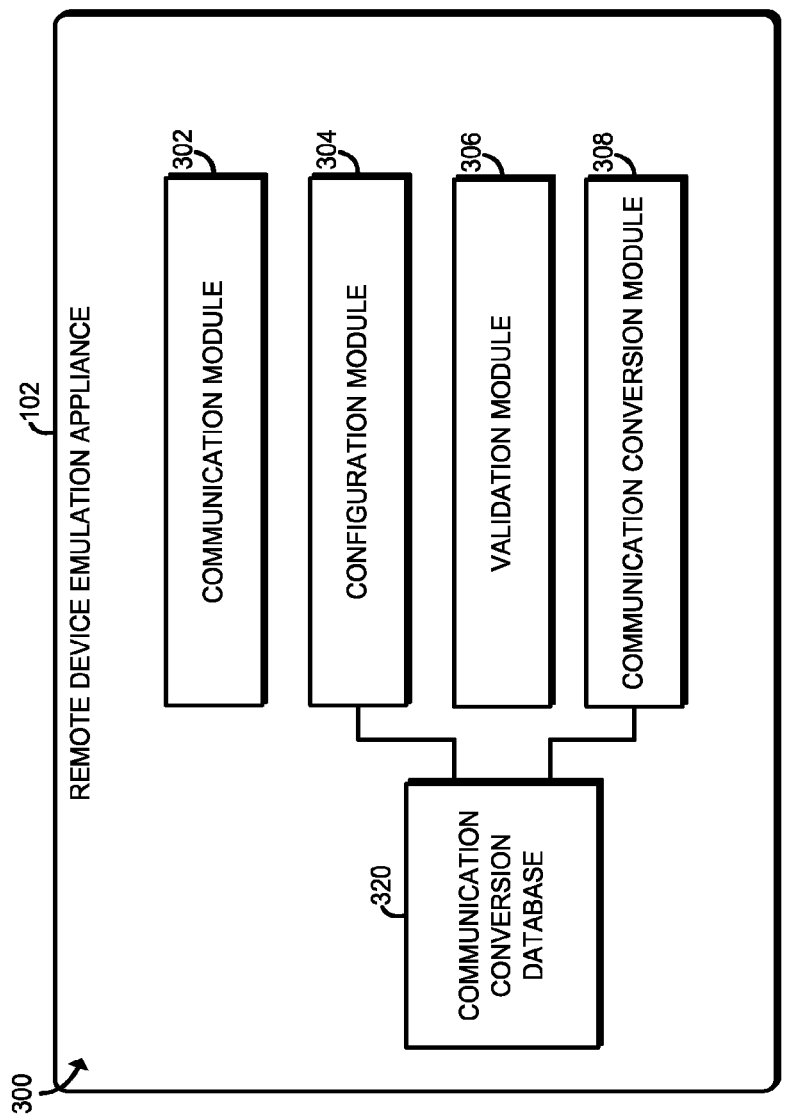
FIG. 3 is a simplified block diagram of at least one embodiment of an environment that may be established by the remote device emulation appliance of FIG. 2.

Referring now to FIG. 3, in use, each remote device emulation appliance 102 may establish an environment 300. The illustrative environment 300 includes a communication module 302, a configuration module 304, a validation module 306, and a communication conversion module 308. Each of the modules and other components of the environment 300 may be embodied as firmware, software, hardware, or a combination thereof. For example the various modules, logic, and other components of the environment 300 may form a portion of, or otherwise be established by, the processor 210, the I/O subsystem 212, an SoC, or other hardware components of the remote device emulation appliance 102. As such, in some embodiments, any one or more of the modules of the environment 300 may be embodied as circuitry or a collection of electrical devices (e.g., a communication circuitry 302, a configuration circuitry 304, a validation circuitry 306, a communication conversion circuitry 308, etc.).

The communication module 302 of the remote device emulation appliance 102 facilitates communications between the remote device emulation appliance 102 and the master programmable logic controller 104 and the drives 106 managed by the remote device emulation appliance 102. For example, the communication module 302 may facilitate communications from the master programmable logic controller 104 and/or other remote device emulation appliances 102 via the input communication port 230 and/or the output communication port 232. Similarly, the communication module 302 may facilitate communication to one or more drives 106 via the control output port 240. Additionally, the communication module 302 may facilitate communications with the remote computer 170 and/or other remote computing devices via the network port 250.

The configuration module 304 is configured to facilitate configuration and customization of the remote device emulation appliance 102. To do so, a user may utilize a remote computer 170 to communicate with the remote device emulation appliance 102 to configure the appliance 102, which is handled by the configuration module 304. For example, as discussed in more detail below, the configuration module 304 allows a user to configure various operational parameters of the drives 106, drive emulation parameters to emulate legacy drives, and/or other conversion parameters for converting communications (e.g., control word format conversion parameters, status word format conversion parameters, etc.). Such configuration and/or conversion data may be stored in the communication conversion database 320 of the data storage 222 and subsequently used to convert communications between the master programmable logic controller 104 and the drives 106 as discussed in more detail below.

The validation module 306 is configured to validate the various settings and configurations implemented by the configuration module 304. For example, if a drive operational parameter is set outside an allowable tolerance of a particular drive, an unusable control format is selected, multiple drives are assigned to the same rack slot, and/or other configuration error occurs, the validation module 306 is configured to detect such errors and notify the user. In this way, the validation module 306 validates the configuration of the remote device emulation appliance 102 prior to implementation of such configuration requests, allowing the user to change or confirm the settings or configuration. In the illustrative embodiment, the validation module 306 is configured to visually identify (e.g., highlight) those settings deemed to be outside a defined threshold or otherwise erroneous.

The communication conversion module 308 is configured to convert communications received from the master programmable logic controller 104 and convert communications received from the drives 106. For example, as discussed in more detail below, the communication conversion module 308 may convert communications received from the master programmable logic controller 104 from a remote input/output protocol usable by a legacy drive to a drive protocol usable by a target drive 106 to which the communication is directed. Additionally or alternatively, the communication conversion module 308 may convert communications received from the target drive 106 from the drive protocol usable by the target drive 106 to a remote input/output protocol usable by a legacy drive. For example, the communication conversion module 308 may convert a format of a control word of a communication received from the master programmable logic controller 104 from a legacy drive format usable by a legacy drive to a drive format usable by a target drive 106. Similarly, the communication conversion module 308 may convert a format of a status word of a communication received from a target drive 106 from the drive format usable by a target drive 106 to a legacy drive format usable by a legacy drive. In a similar manner, the communication conversion module 308 may convert drive operational parameters of a target drive 106 from the legacy drive format to the drive format usable by the target drive 106 and/or from the drive format to the legacy drive format as discussed in more detail below.

Figure 4:
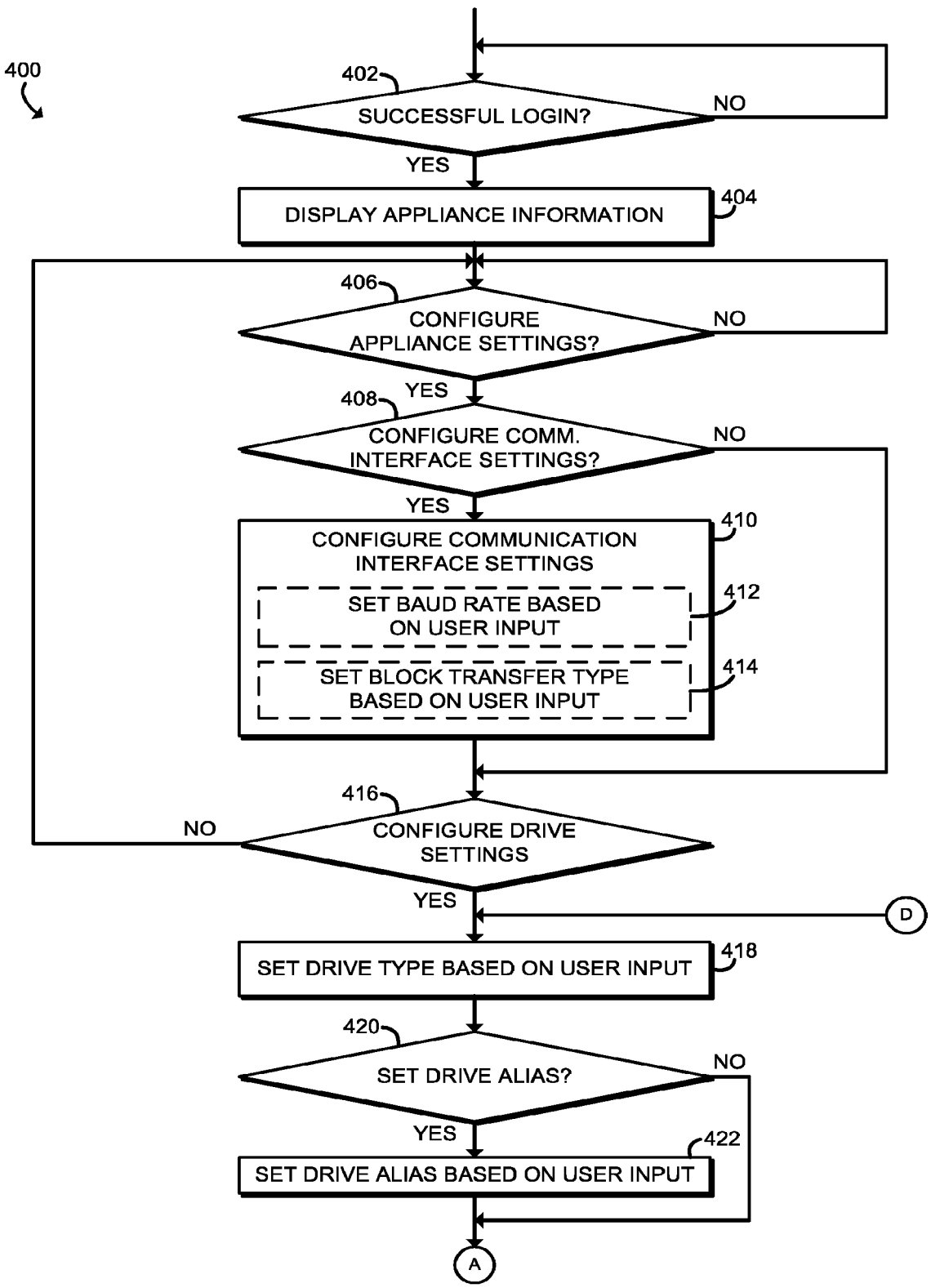
FIGS. 4-6 is a simplified flow diagram of at least one embodiment of a method for configuring a drive of the control system of FIG. 1 that may be executed by the remote device emulation appliance of FIGS. 2 and 3.
Figure 5:
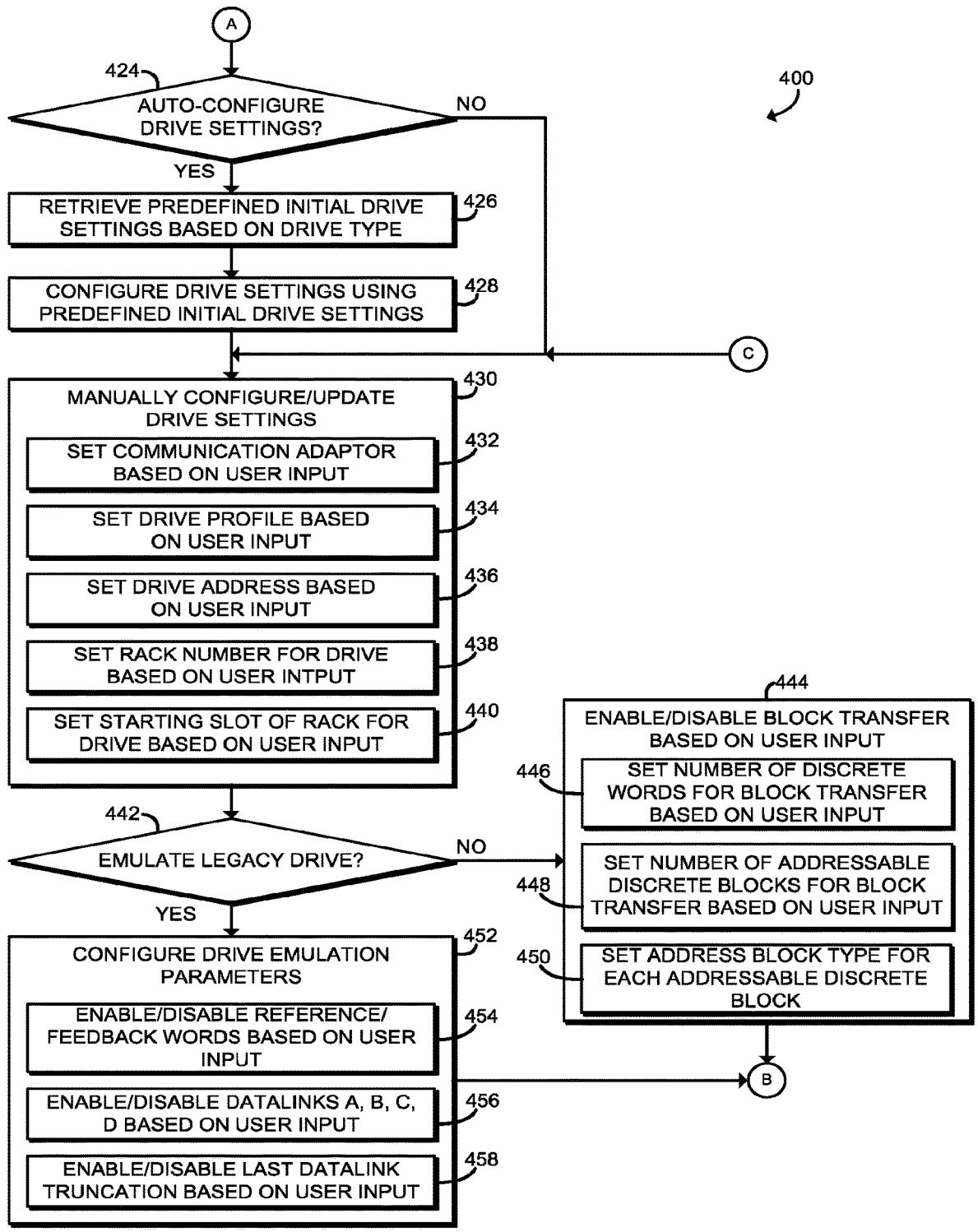
Figure 6:
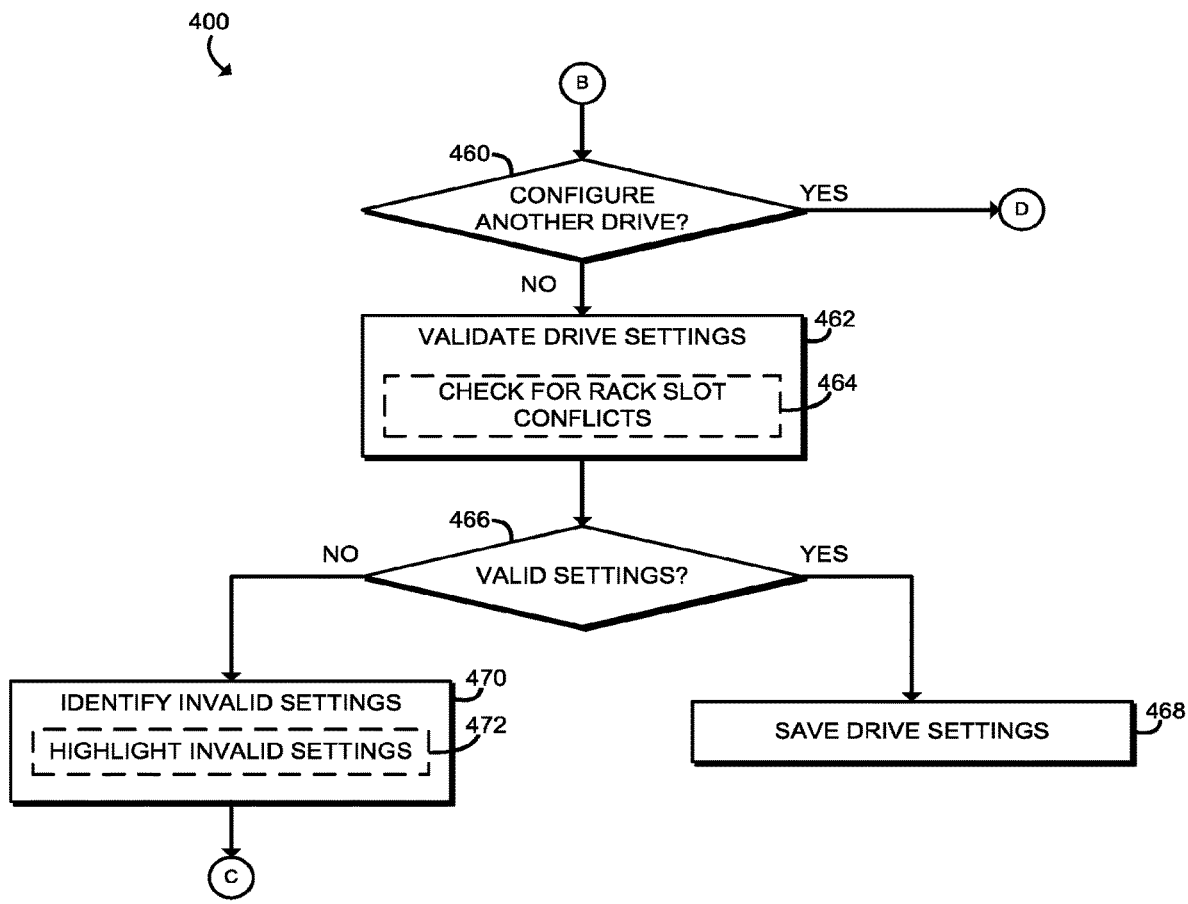

Referring now to FIGS. 4-6, in use, the remote device emulation appliance 102 may execute a method 400 for configuring control parameters of a drive 106 of the system 100. The method 400 begins with block 402 in which the remote device emulation appliance 102 determines whether a user has successfully logged into the remote device emulation appliance 102. As discussed above, a user may utilize a remote computer 170 communicatively coupled to the network port 250 to communicate with the remote device emulation appliance 102. In response to successful communicative coupling, the remote device emulation appliance 102 presents a user interface (e.g., user interface 700 of FIG. 7) to the user via a suitable display device of the remote computer 170. The user may log into the remote device emulation appliance 102 via the user interface using any suitable user authentication scheme (e.g., password, passcode, biometric parameters, etc.).

If the remote device emulation appliance 102 successfully authenticates the user, the method 400 advances to block 404 in which the remote device emulation appliance 102 displays appliance information on the remote computer 170 via the user interface. The appliance information may include any type of information related to the remote device emulation appliance 102 such as the model number, part number, serial number, the machine access code (MAC) number, the present firmware and software revision executed by the remote device emulation appliance 102, and/or other information describing aspects of the remote device emulation appliance 102 itself.

In block 406, the remote device emulation appliance 102 determines whether a user desires to configure appliance settings. The appliance settings may include any user-configurable setting or parameter of the remote device emulation appliance 102 including, for example, communication, drive settings, drive emulation settings, conversion parameters, and/or other configurable settings of the remote device emulation appliance 102. If so, the method 400 advances to block 408 in which the remote device emulation appliance 102 determines whether the user desires to update or configure communication interface settings of the remote device emulation appliance 102 (e.g., based on user-supplied input or request). The communication interface settings may define various parameters or aspects of the underlying communication protocol and/or associated hardware used by the remote device emulation appliance 102 to communicate with the master programmable logic controller 104 and/or the drives 106. For example, in block 412, the remote device emulation appliance 102 may set the baud rate of the communications based on a user selection or input. Additionally or alternatively, the remote device emulation appliance 102 may set the block transfer type of the communications based on a user selection or input. As discussed in more detail below, the block transfer type defines the particular protocol for transferring chucks or blocks of remote input/output (ROI) data between the remote device emulation appliance 102 and the master programmable logic controller 104. Of course, other communication parameters may be set in block 406 including, for example, the Internet Protocol (IP) address of the remote device emulation appliance, any subnet masking, and/or other communication parameters.

Figure 7:
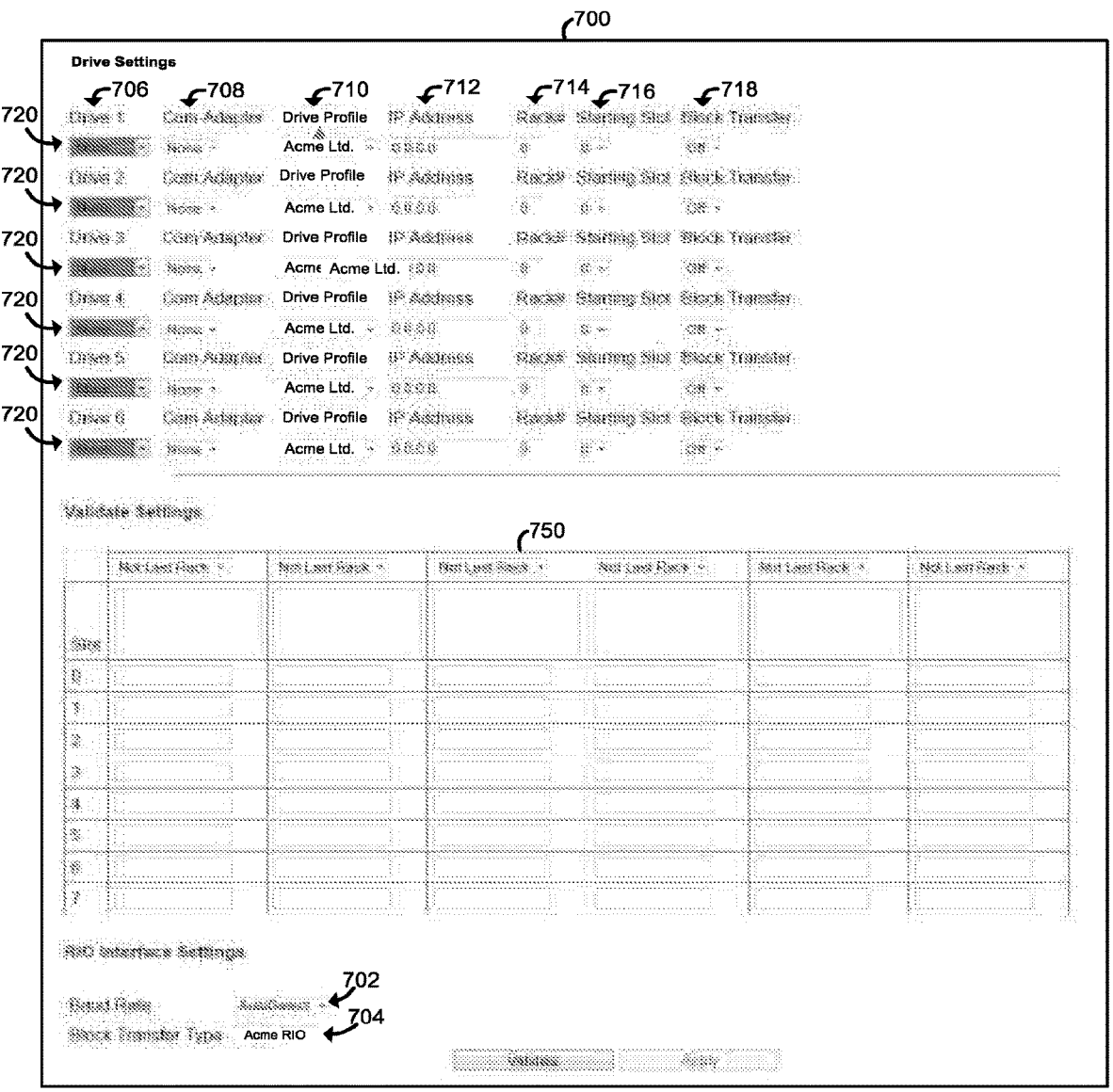

The user may select, set, or otherwise supply the communication interface settings using any suitable user interface input mechanism such as a drop-down window, data entry cell, or other data entry technology. For example, as shown in FIG. 7, the remote device emulation appliance 102 may generate a user interface 700 for display on the remote computer 170 during configuration. The illustrative user interface 700 includes a baud rate drop-down window 702, which the user may interact with to select a baud rate from a list of possible choices displayed in the drop-down window 702. Similarly, the illustrative user interface 700 includes a block transfer type drop-down window 704 from which the user may select a block transfer type from a list of possible choices displayed in the drop-down window 704.

Referring back to FIG. 4, if no communication interface settings are to be configured in block 408 or after such configuration in block 410, the method 400 advances to block 416 in which the remote device emulation appliance 102 determines whether the user desires to configure drive settings of one or more drives 106 controlled by the remote device emulation appliance 102 (e.g., based on a user-supplied request or input). If not, the method 400 loops back to block 406 in which the remote device emulation appliance 102 again determines whether the user desires to configure any additional settings of the remote device emulation appliance 102. However, if the remote device emulation appliance 102 determines that user desires to configure drive settings in block 416, the method 400 advances to block 418 in which the remote device emulation appliance 102 sets the drive type of one or more of the drives 106 based on a user selection or input. That is, the user may select or define the type of drive of each of the drives 106 based on the physical type, model, or other identification data of the drive 106. To do so, as shown in FIG. 7, the user may select the drive type from a drive type drop-down window 706 for the particular drive 106 of interest. As also shown in FIG. 7, the illustrative user interface 700 includes a row 720 of adjustable or settable drive settings for each drive 106 supported by the remote device emulation appliance 102. As discussed above, the illustrative remote device emulation appliance 102 is capable of controlling up to six drives 106, but additional or fewer drives 106 may be supported in other embodiments. Each row 720 includes various data entry widgets 706-718 for selecting or setting particular drive settings for each corresponding drive 106 as discussed in more detail below.

Figure 9:
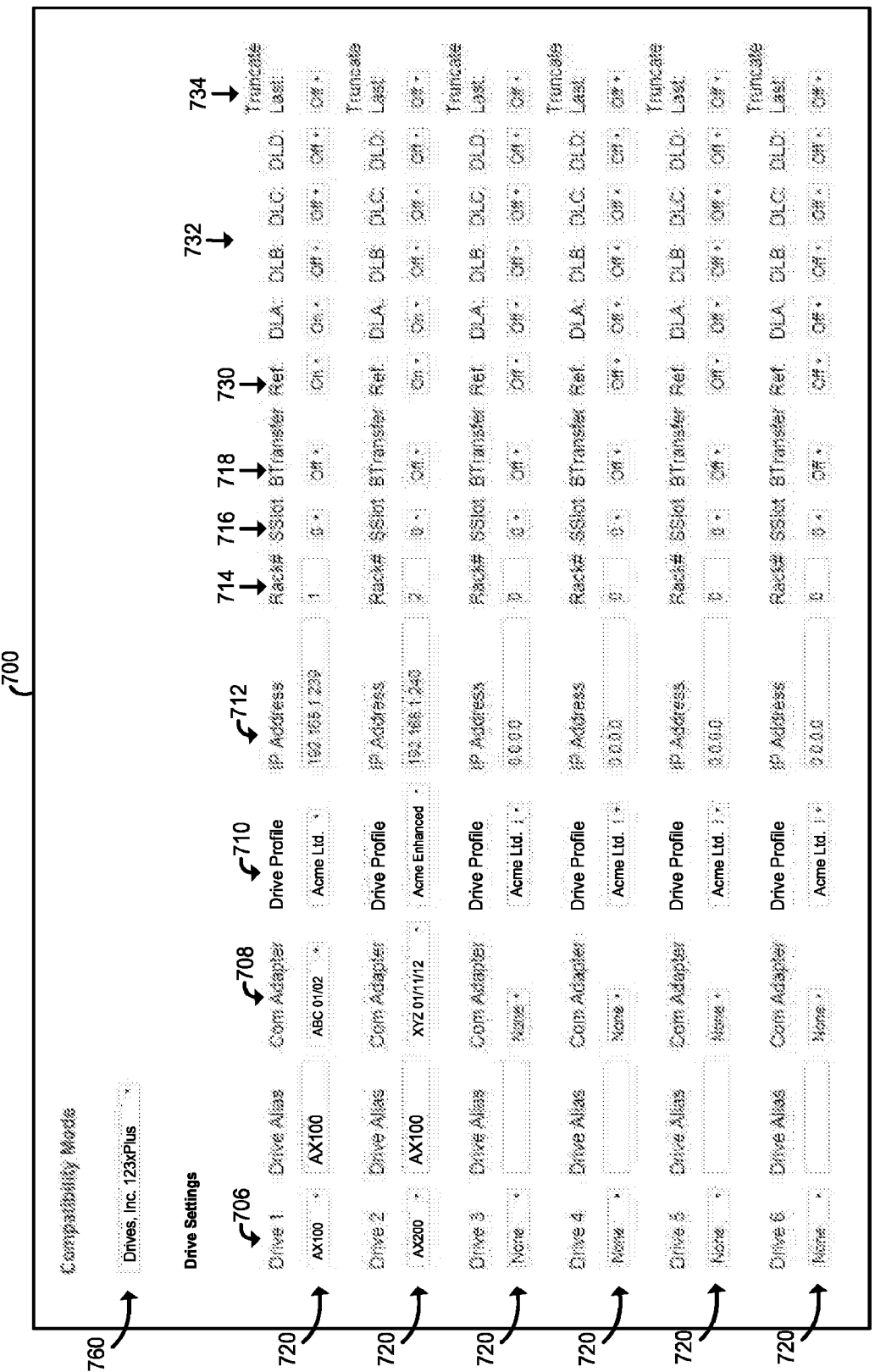

Referring back to FIG. 4, after the remote device emulation appliance 102 has set the drive type for the present drive 106 of interest in block 418 based on the user input, the method 400 advances to block 420. In block 420, the remote device emulation appliance 102 determines whether the user desires to set a drive alias for the present drive 106. Each drive alias may be embodied as a "nickname" or other identifier that uniquely identifies each particular drive 106, which may improve the ease of managing drives 106 of the same type. If the remote device emulation appliance 102 determines that the user desires to set a drive alias for the present drive 106, the method 400 advances to block 422 in which the remote device emulation appliance 102 sets the drive alias for the present drive 106 based on user input. For example, the user may type in the desired drive alias or select a pre-defined alias via the user interface 700 (see, e.g., FIG. 9).

After the remote device emulation appliance 102 has set the desired drive alias in block 422 or if no drive alias is desired, the method 400 advances to block 424 of FIG. 5. In block 424, the remote device emulation appliance 102 determines whether to auto-configure drive settings based on the drive type of the present drive 106 selected in block 418. For example, the remote device emulation appliance 102 may be configured to automatically configure drive settings based on the selected drive type or may do so in response to a user's instruction or selection. If so, the method 400 advances to block 426 in which the remote device emulation appliance 102 retrieves configuration data from the data storage 222 based on the selected type of drive 106, which includes predefined settings for the present drive 106. Subsequently, in block 428, the remote device emulation appliance 102 configures the drive settings for the present drive 106 using the retrieved configuration data. The drive settings may include any drive operational parameter of the drive 106 that may be configured or otherwise set such as the communication adaptor, drive profile, drive address, rack number, starting slot, block transfer type, and/or other operational parameter's as discussed below.

After the remote device emulation appliance 102 has configured the initial drive settings in block 428 or if auto-configuration of drive settings is not desired, the method 400 advances to block 430 in which the user may manually configure and/or update drive settings of the present drive 106. For example, in block 432, the remote device emulation appliance 102 may set a communication adaptor for the present drive 106 based on a user's selection or input. The communication adaptor defines the type of communication protocols that will be used by the remote device emulation appliance 102 to communicate with the present drive 106. In some embodiments, the available communication adaptors may be based on the drive type set in block 418. In block 434, the remote device emulation appliance 102 may set a drive profile for the present drive 106 based on a user's selection or input. The drive profile defines a main control word and status word(s), along with the specific bit order of each. As discussed in more detail below, the control and status words facilitate configuration and monitoring of the drive. For example, the control word is transmitted by the master programmable logic controller 104 to the corresponding drive via the remote device emulation appliance 102 to control the various stats of the drive. The status word is transmitted by drive to the master programmable logic controller 104 via the remote device emulation appliance 102 to provide information related to the drive to the master programmable logic controller 104. The drive profile may also include various reference values, such as a drive speed and/or torque reference for the drive.

In block 436, the remote device emulation appliance 102 may set an address for the present drive 106 based on a user's selection or input. The address (e.g., an Internet Protocol address) defines the logical location on a network of the present drive 106 and is used by the remote device emulation appliance 102 to communicate with the present drive 106. In block 438, the remote device emulation appliance 102 may set a rack number for the present drive 106 based on a user's selection or input. The rack number defines the logical rack to which the present drive 106 belongs. For example, all drives 106 having the same rack number belong to the same logical rack. Similarly, in block 440, the remote device emulation appliance 102 may set a starting slot of the corresponding rack for the present drive 106 based on a user's selection or input. The starting slot identifies the slot of the logical rack from which the present drive 106 will be mapped. Depending on other configured settings and drives 106, the available valid starting slots for a particular drive 106 may change.

The user may select or set each of the drive settings discussed above using any suitable input mechanism of the user interface 700. For example, as shown in FIG. 7, the illustrative user interface 700 includes a communication adaptor drop-down window 708, a drive profile drop-down window 710, a drive address window 712, a rack number window 714, and a start slot drop-down window 716 for each drive 106 managed by the remote device emulation appliance 102. A user may select or enter the appropriate drive setting data in each of the windows 708-716. As discussed above, the available settings in some of the windows 708-716 may be restricted, updated, or modified based on other settings of the present drive 106 and/or other drives 106.

Figure 8:
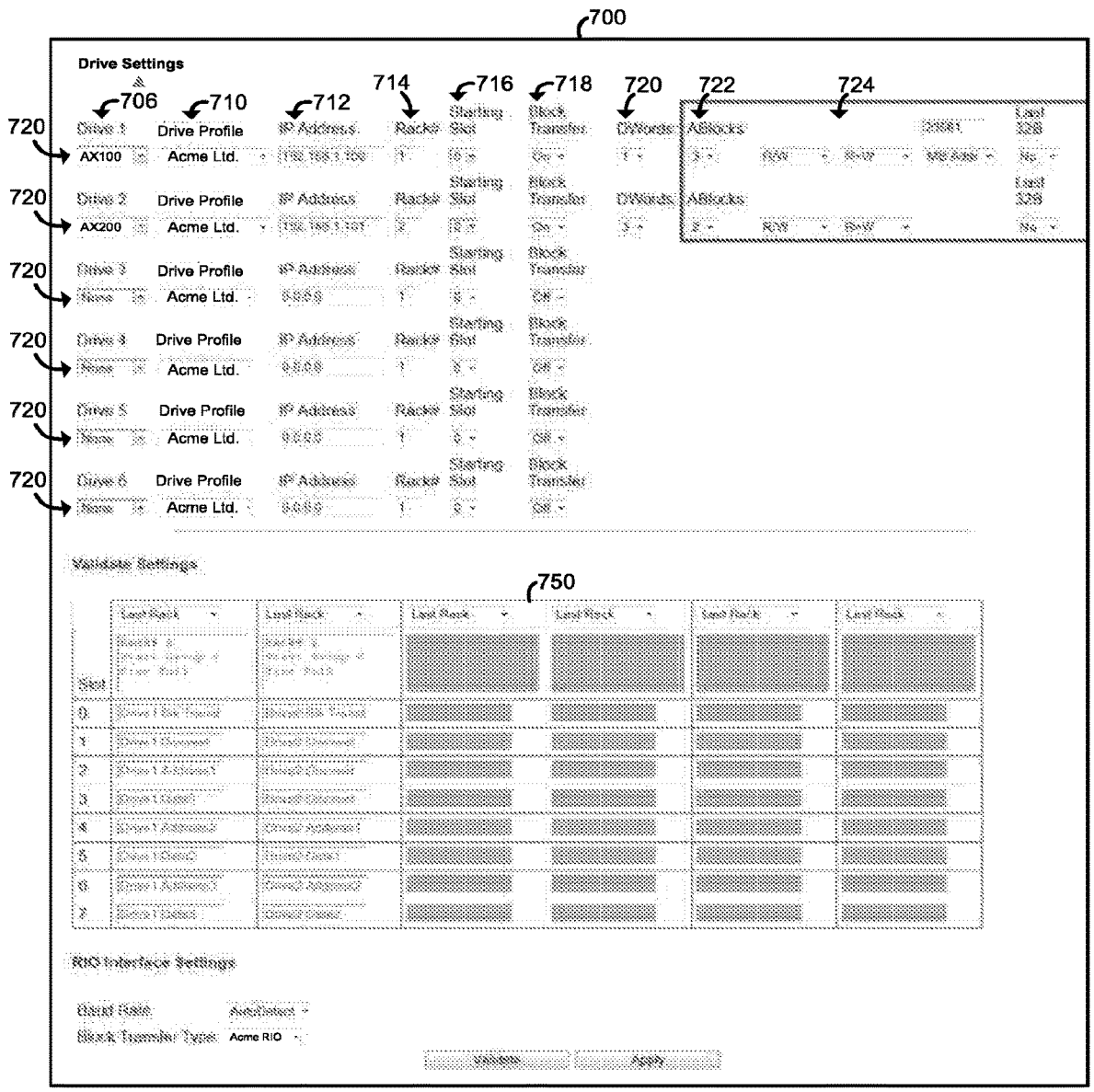

As the user configures (or the remote device emulation appliance 102 auto-configures) the drive settings for each drive 106, corresponding drive setting data is displayed to the user in a validation window 750. For example, as shown in FIG. 8, the illustrative validation window 750 indicates that various data parameters of a Drive1 have been assigned to corresponding slots of rack 1 and various data parameters of a Drive2 have been assigned to corresponding slots of rack 2. The validation window 750 allows the user to visually verify the drive settings, as well as indicate to the user any invalid configurations as discussed in more detail below.

Referring back to FIG. 5, after the initial drive settings have been configured or updated in block 430, the method 400 advances to block 442 in which the remote device emulation appliance 102 determines whether the present drive 106 is to emulate a legacy drive. As discussed above, the remote device emulation appliance 102 may emulate legacy drives such that the present drive 106 appears as the emulated legacy drive to the master programmable logic controller 104. By emulating a legacy drive, a newer or different drive 106 may be used in the system 100 without reprogramming the master programmable logic controller 104 and/or rewiring of the system 100.

If drive emulation is not desired, the method 400 advances to block 444 in which the remote device emulation appliance 102 enables or disables block transfer for the present drive 106 based on a user selection or input. As discussed above, block transfer allows the remote device emulation appliance 102 and the master programmable logic controller 104 to transfer information regarding the present drive 106 between each other in larger chucks of data relative to non-block transfer communication. A user may enable block transfer for the present drive 106 by selecting block transfer from a block transfer drop-down window 718 of the illustrative user interface 700 associated with the present drive 106 as shown in FIG. 7.

Referring back to FIG. 5, if block transfer is enabled, the remote device emulation appliance 102 may set the number of discrete words for each block transfer for the present drive 106 based on a user selection or input in block 446. For example, the user may select the number of discrete words from a discrete word drop-down window 720 (see FIG. 8). The available number of discrete words may be defined or limited by the type of drive profile selected in block 434. In block 448, the remote device emulation appliance 102 may set the number of addressable discrete blocks for block transfer for the present drive 106 based on a user selection or input. For example, the user may select the number of addressable block from an addressable block drop-down window 722 (see FIG. 8). Additionally, in block 450, the remote device emulation appliance 102 may set the block type for each addressable block identified in block 448 based on user input. For example, the user may select the block type for each addressable block via corresponding block type drop-down windows 724 (see FIG. 8). Of course, additional or other parameters related to addressable blocks may be set via the user interface 700.

Referring back to block 442 of FIG. 5, if the remote device emulation appliance 102 determines that drive emulation is desired, the method 400 advances to block 452 in which initial drive emulation parameters are set. To do so, in block 454, the remote device emulation appliance 102 may enable or disable reference/feedback words based on user input or selection. For example, the user may enable or disable the reference/feedback words from a reference drop-down window 730 of the illustrative user interface 700 (see FIG. 9). Additionally, in block 456, the remote device emulation appliance 102 may enable or disable various datalink pairs (e.g., datalink pairs A, B, C, and/or D) s for the present drive 106. To do so, the user may enable or disable each datalink pair via a corresponding datalink drop-down window 732 of the illustrative user interface 700 (see FIG. 9). The remote device emulation appliance 102 may also enable or disable last datalink truncation based on user input or selection in block 458. If last datalink truncation is enabled, the remote device emulation appliance 102 truncates the last data link pair to one word for the corresponding drive 106. A user may enable or disable the datalink truncation for each drive 106 via a datalink truncation drop-down window 734 of the illustrative user interface 700 (see FIG. 9).

Referring back to FIG. 5, after the drive emulation parameters have been configured in block 452 or the block transfer parameters have been configured in block 444, the method 400 advances to block 460 of FIG. 6. In block 460, the remote device emulation appliance 102 determines whether the user desires to configure another drive 106 managed by the remote device emulation appliance 102. If so, the method 400 loops back to block 418 of FIG. 4 in which the user may set the drive type for the next drive 106 being configured. If not, the method 400 advances to block 462 in which the drive settings for each configured drive 106 are validated. To do so, the remote device emulation appliance 102 may utilize any algorithm and/or data, which may be stored in the data storage 222, to validate any one or more drive settings for each configured drive 106. For example, in block 464, the remote device emulation appliance 102 may check for any rack slot conflicts in the drive settings. That is, the remote device emulation appliance 102 may verify that only one drive has been assigned to each rack slot. Of course, the remote device emulation appliance 102 may validate additional or other drive settings in other embodiments. For example, the remote device emulation appliance 102 may ensure a particular drive operational parameter setting is within a defined threshold or range of values, the format of the drive setting is valid, and/or other aspects or characteristics of the drive settings are valid.

In block 466, the remote device emulation appliance 102 determines whether the present drive settings for each configured drive are valid. If so, the method 400 advances to block 468 in which the drive settings are stored in the data storage 222. Additionally or alternatively, some of the drive settings, or conversion data based on such drive settings, may be stored in the communication conversion database 320. If, however, the remote device emulation appliance 102 determines that the drive settings are not valid, the method 400 advances to block 470 in which the remote device emulation appliance 102 identifies any invalid drive settings to the user. For example, in block 472, the remote device emulation appliance 102 may highlight those drive settings determined to be invalid. After the invalid drive settings have been identified to the user, the method 400 subsequently loops back to block 430 in which the user may update the conflicting drive settings.

Figure 10:
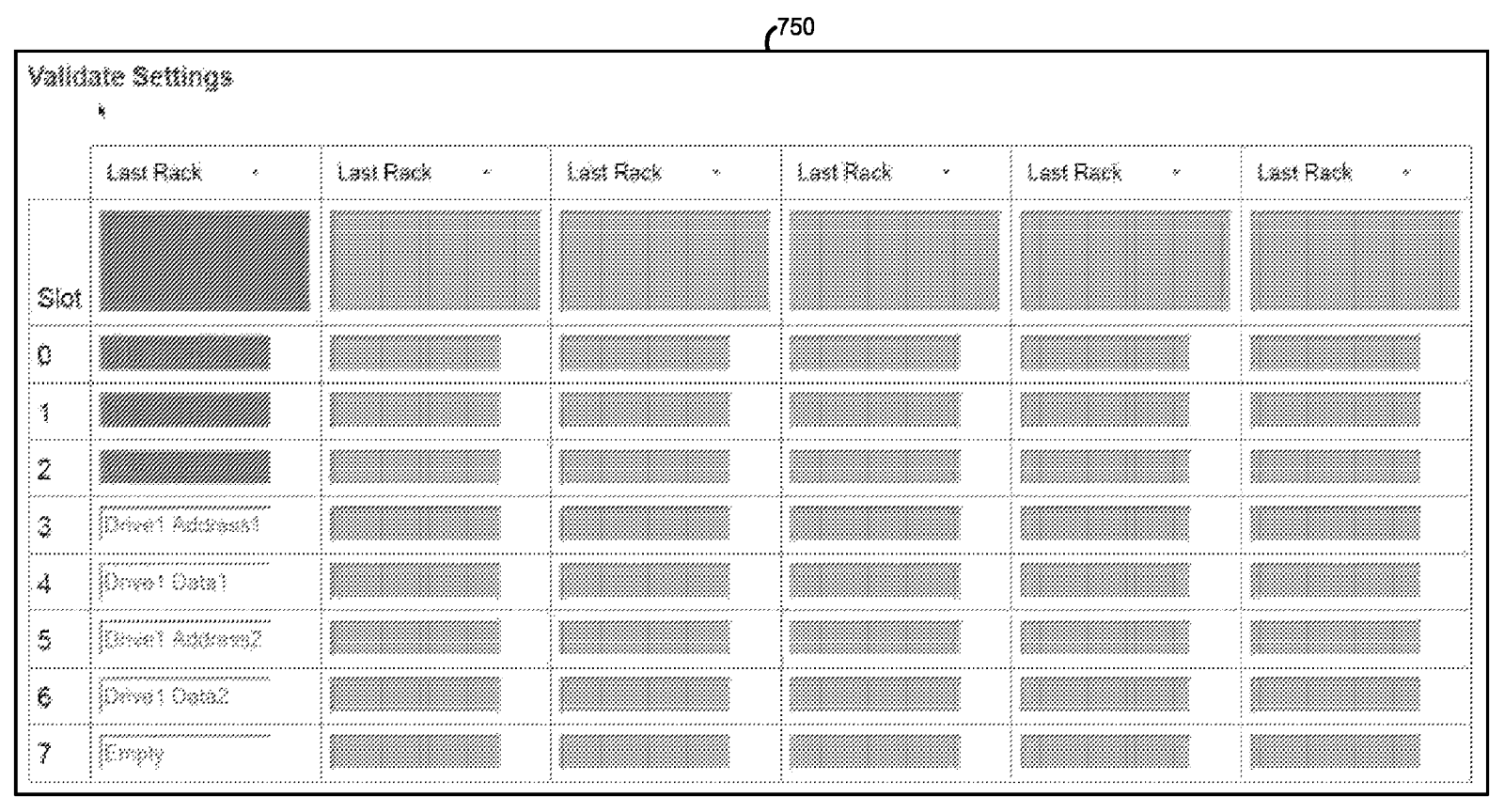

The remote device emulation appliance 102 may utilize any methodology to identify or highlight invalid drive settings including changing the color, font type, or font characteristics of invalid drive settings. For example, in the illustrative embodiment of FIG. 10, both Drive1 and Drive 2 have been assigned to slots 0, 1, and 2 of Rack 1, which results in a slot conflict. To identify the conflict to the user, the remote device emulation appliance 102 highlights the corresponding data cells of the validation window 750. Of course, in other embodiments, the remote device emulation appliance 102 may highlight or identify the slot conflicts using other identification methodologies as discussed above.

Figure 11:
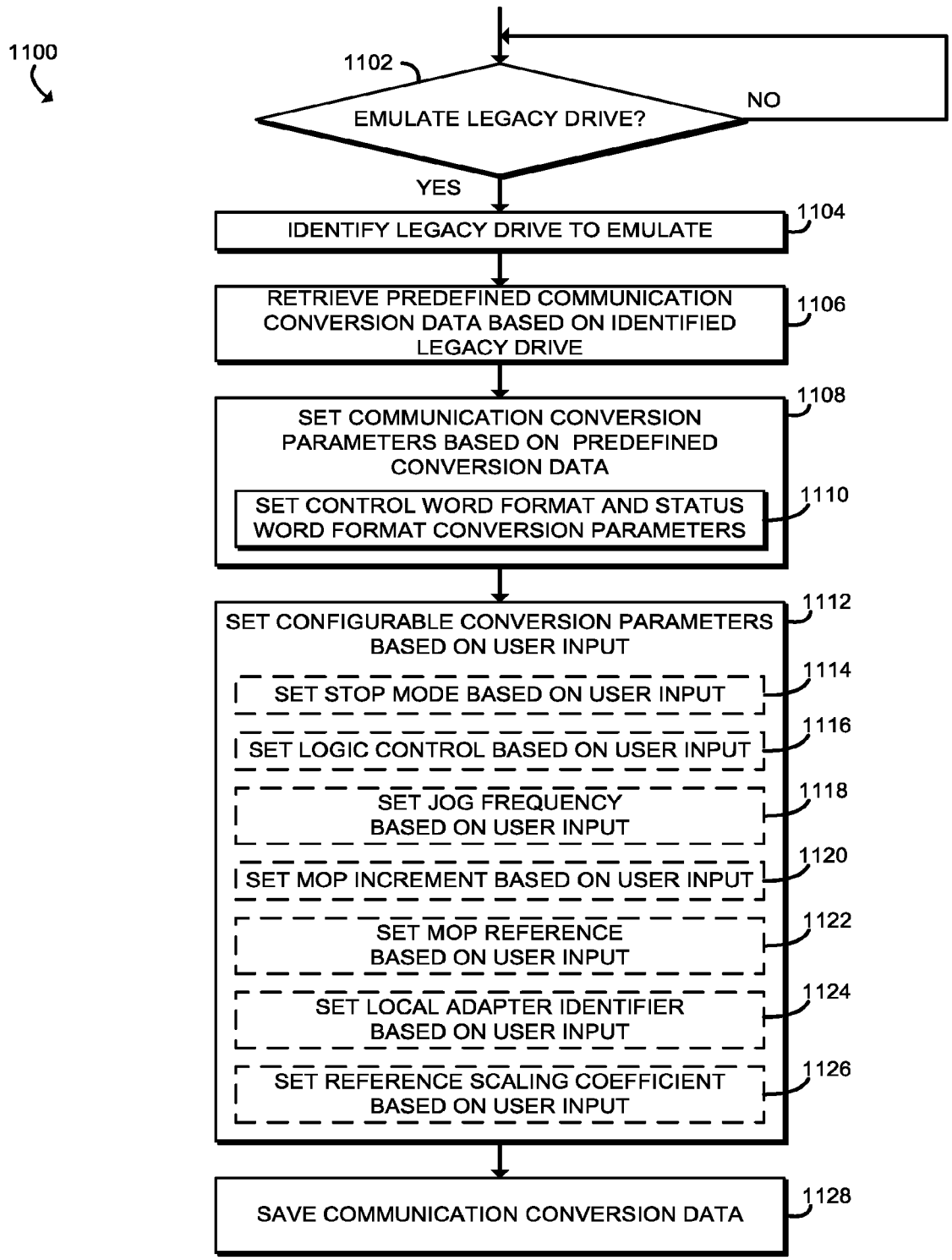
FIG. 11 is a simplified flow diagram of at least one embodiment of a method for configuring drive emulation that may be executed by the remote device emulation appliance of FIGS. 2 and 3.

Referring now to FIG. 11, if drive emulation has been elected, the remote device emulation appliance 102 may execute a method 1100 for configuring additional parameters of the drive emulation. The method 1100 begins with block 1102 in which the remote device emulation appliance 102 determines whether to implement drive emulation. As discussed above, the user may enable or select drive emulation from a user interface generated on the remote computer 170 by the remote device emulation appliance 102. If drive emulation is enabled, the method 1100 advances to block 1104 in which remote device emulation appliance 102 identifies the legacy drive to emulate. To do so, a user may identify the legacy drive by selecting the drive from a compatibility drown-down menu 760 of the illustrative user interface 700 (see FIG. 9). In some embodiments, the available legacy drives may be predetermined based on available conversion configuration data and/or other criteria.

In block 1106, the remote device emulation appliance 102 retrieves communication conversion data from the communication conversion database 320 based on the identified legacy drive. The communication conversion data may be embodied as or otherwise include any type of data useable by the remote device emulation appliance 102 to convert communications received from the master programmable logic controller 104 and directed to a target drive 106 managed by the remote device emulation appliance 102 from a format and/or protocol unusable by the target drive 106 to a format and/or protocol usable by the target drive 106. Additionally, the communication conversion data may be embodied as or otherwise include any type of data useable by the remote device emulation appliance 102 to convert communications received from the target drive 106 and directed to the master programmable logic controller 104 from the format and/or protocol usable by the target drive 106 to the format and/or protocol unusable by the target drive 106. For example, the conversion data may include a set of rules for converting a control word received in communications from the master programmable logic controller 104 from a legacy drive format to a target drive format usable by the target drive 106. Similarly, the conversion data may include a set of rules for converting a status word receive din communications from the target drive 106 from a target drive format usable by the target drive 106 to a legacy drive format unusable by the target drive 106, but useable by the master programmable logic controller 104. In this way, and as discussed in more detail below, the remote device emulation appliance 102 may emulate a legacy drive by converting communications between the master programmable logic controller 104 and the target drive(s) 106.

In block 1108, the remote device emulation appliance 102 sets the communication conversion parameters to be used to convert communications using the predefined communication conversion data retrieved in block 1106. For example, in block 1110, the remote device emulation appliance 102 may set the control word format and/or status word format conversion parameters used to convert control words from the legacy drive format to the target drive format and convert status words from the target drive format to the legacy drive format to thereby emulate the legacy drive as discussed below.

In some embodiments, the user may additional set configurable conversion parameters in block 1112. Such configurable conversion parameters may include the conversion data retrieved in block 1106 (i.e., the user may update or modify the predetermined conversion parameters) and/or additional conversion parameters that may not be predefined. For example, in block 1114, the remote device emulation appliance 102 may set the stop mode for the present drive 106 based on a user selection or input. The stop mode defines stop profile for the particular drive (e.g., "ramp to stop," "coast to stop," "emergency stop," etc.). In block 1116, the remote device emulation appliance 102 may set the logic control for the present drive 106 based on a user selection or input. The logic control defines the meaning or impact of particular bits of the control word. In block 1118, the remote device emulation appliance 102 may set the jog frequency for the present drive 106 based on a user selection or input. The jog frequency defines the frequency of rotation of the shaft of the present drive 106 during a jog movement. The jog frequency may be represented in Hertz or revolutions per minute (RPM). In block 1120, the remote device emulation appliance 102 may set the Motor Operated Potentiometer (MOP) increment for the present drive 106 based on a user selection or input. The MOP increment defines the amount of shaft rotation of the present drive 106 for each MOP increment.

Additionally, in block 1122, the remote device emulation appliance 102 may set the MOP reference for the present drive 106 based on user selection or input. The MOP reference defines the initial value or setting for the MOP control of the present drive 106. As with the jog frequency, the MOP increment and reference may be represented in Hertz or RPMs. In block 1124, the remote device emulation appliance 102 may set the adapter identifier control for the present drive 106 based on a user selection or input. The adapter identifier identifies the communication adapter for the present drive 106 selected in block 432 of method 400. As the communication adapter may be previously defined, the adapter identifier may be automatically set or configured by the remote device emulation appliance 102 in some embodiments. In block 1126, the remote device emulation appliance 102 may set the scaling coefficient for the present drive 106 based on a user selection or input. The scaling coefficient defines the scaling between the speed reference as represented in the legacy drive format relative to the target drive format (i.e., the scaling difference between the speed control of the legacy drive relative to the target drive).

The user may select or set each of the configurable conversion parameters discussed above using any suitable input mechanism of the user interface 700. For example, as shown in FIG. 12, the remote device emulation appliance 102 may present a compatibility interface 1200 to the user via the remote computer 170. The illustrative compatibility interface 1200 includes a stop mode drop-down window 1202, a logic control drop-down window 1204, a jog frequency data cell 1206, a MOP increment data cell 1208, a MOP reference data cell 1210, and a reference scaling coefficient data cell 1214 for each drive 106 managed by the remote device emulation appliance 102. A user may select or enter the appropriate conversion data in each of the windows 1202-1214 for each respective drive 106.

Referring back to FIG. 11, after the user has configured any additional conversion parameters in block 1112, the communication conversion data is saved in the communication conversion database 320 in block 1128. As discussed in more detail below, the communication conversion data may be subsequently retrieved by the remote device emulation appliance 102 to facilitate conversion of communications between the master programmable logic controller 104 and the drive(s) 106.

Figure 13:
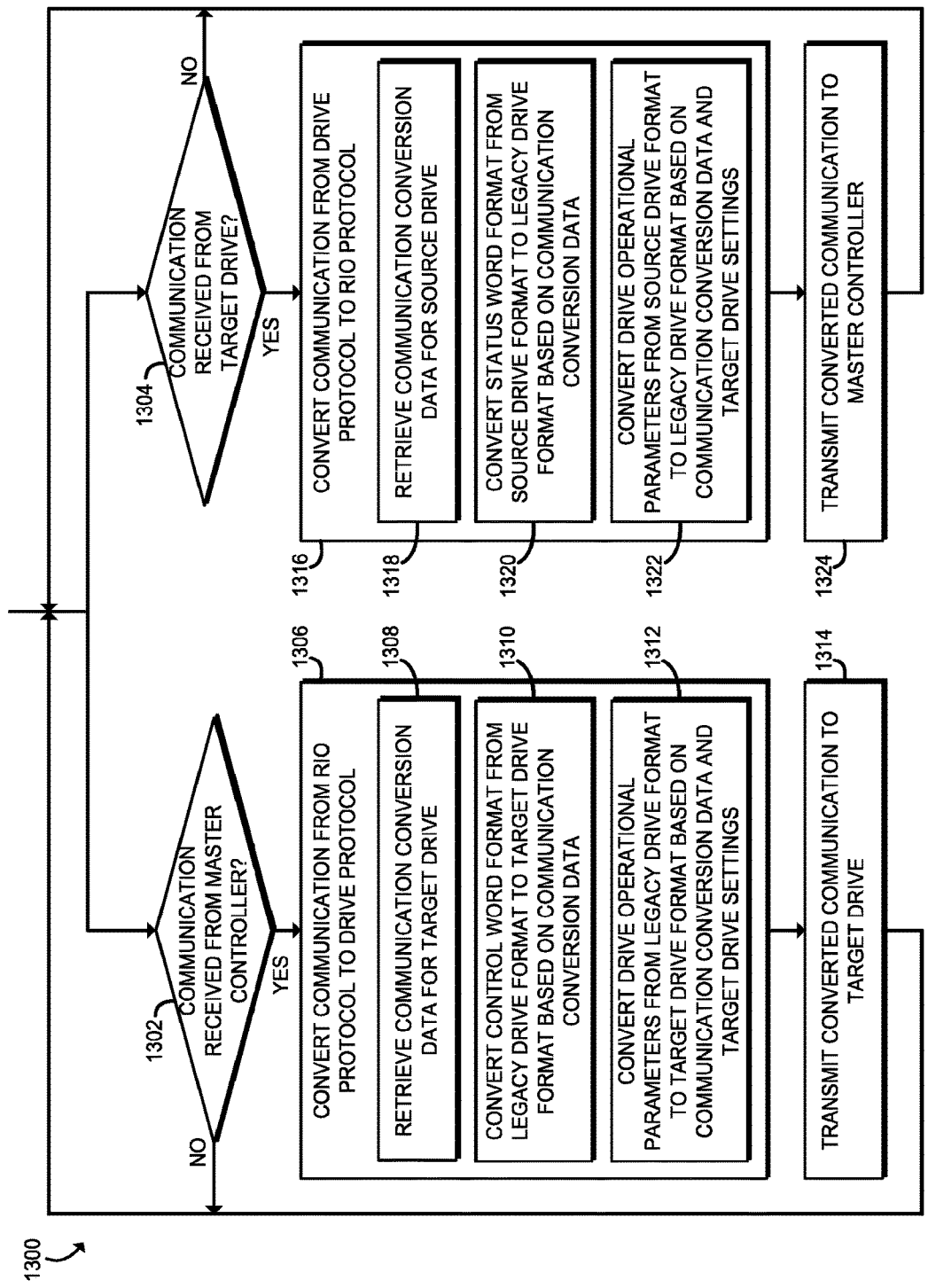
FIG. 13 is a simplified flow diagram of at least one embodiment of a method for facilitating communication between a master programmable logic controller and a target drive of the system of FIG. 1, which may be executed by the remote device emulation appliance of FIGS. 2 and 3.

Referring now to FIG. 13, in use, the remote device emulation appliance 102 may execute a method 1300 for facilitating communication between the master programmable logic controller 104 and a target drive 106 managed by the remote device emulation appliance 102. The method 1300 begins with block 1302 and 1304, which may be executed in parallel or otherwise contemporaneously with each other. In block 1302, the remote device emulation appliance 102 determines whether a communication has been received from the master programmable logic controller 104. If so, the method 1300 advances to block 1306 in which the communication received from the master programmable logic controller 104 is converted from the remote input/output protocol used by the controller 104 to transmit the communication (e.g., a legacy drive format) to a drive protocol usable by the target drive 106 to which the communication is directed. That is, as discussed above, the remote device emulation appliance 102 may convert the received communication from a format or protocol unusable by the target drive (e.g., the legacy drive format) to a format or protocol usable by the target drive. To do so, in some embodiments, the remote device emulation appliance 102 may retrieve communication conversion data from the communication conversion database 320 in block 1308. As discussed above, the communication conversion data may include a set of rules for converting the communications from the legacy drive format or protocol to the target drive format or protocol. As such, in block 1310, the remote device emulation appliance 102 may convert a control word included in the communication received from the master programmable logic controller 104 from a legacy drive format unusable by the target drive 106 (e.g., a drive format configured for a legacy drive) to a target drive format usable by the target drive 106 based on the communication conversion data. Additionally, in some embodiments in block 1312, the remote device emulation appliance 102 may convert drive operational parameters (e.g., a speed control instruction) from the legacy drive format unusable by the target drive 106 to a drive format usable by the target drive 106 based on the communication conversion data and drive settings of the target drive 106.

After the remote device emulation appliance 102 has converted the communication from the remote input/output protocol to the drive protocol in block 1306, the method 1300 advances to block 1314. In block 1314, the remote device emulation appliance 102 transmits the converted communication to the target drive 106 to control operation of the drive 106. For example, the communication may include a control word converted from the legacy drive format to the target drive format that dictates operation of the target drive 106. After the remote device emulation appliance 102 transmits the converted communication to the target drive in block 1314, the method 1300 loops back to blocks 1302 and 1304 to monitor for additional communications.

Referring back to block 1304, the remote device emulation appliance 102 also monitors for communications received from one or more of the drives 106 managed by the appliance 102. If a communication is received from a target drive 106, the method 1300 advances to block 1316 in which the communication received from the target drive 106 is converted from the drive protocol to the remote input/output protocol (e.g., a legacy drive format) used by master programmable logic controller 104. That is, as discussed above, the remote device emulation appliance 102 may convert the received communication from a format or protocol usable by the target drive 106 to a format or protocol unusably by the target drive 106 (e.g., the legacy drive format). To do so, in some embodiments, the remote device emulation appliance 102 may retrieve communication conversion data from the communication conversion database 320 in block 1318. As discussed above, the communication conversion data may include a set of rules for converting the communications from the target drive format or protocol to a legacy drive format or protocol. As such, in block 1320, the remote device emulation appliance 102 may convert a status word included in the communication received from the target drive 106 from a target drive format usable by the target drive 106 to a legacy drive format unusable by the target drive 106 (e.g., a drive format configured for a legacy drive) based on the retrieved communication conversion data. Additionally, in some embodiments in block 1322, the remote device emulation appliance 102 may convert drive operational parameters (e.g., a speed control instruction) from the target drive format usable by the target drive 106 to a legacy drive format unusable by the target drive 106 based on the communication conversion data and drive settings of the target drive 106.

After the remote device emulation appliance 102 has converted the communication from the drive protocol to the remote input/output protocol in block 1316, the method 1300 advances to block 1324. In block 1324, the remote device emulation appliance 102 transmits the converted communication to the master programmable logic controller 104. For example, the communication may include a status word converted from the target drive format to the legacy drive format that informs the master programmable logic controller 104 of particular status of the target drive 106 and/or other remote input. After the remote device emulation appliance 102 transmits the converted communication to the target drive in block 1324, the method 1300 loops back to blocks 1302 and 1304 to monitor for additional communications.

In this way, the remote device emulation appliance 102 is capable of converting communications between the master programmable logic controller 104 and target drives 106 managed by the remote device emulation appliance 102. As such, newer drives 106 and/or drives 106 having communication formats or protocols different from those of the legacy drives for which the master programmable logic controller 104 is currently programmed to control may be used with the controller 104 without the need to reprogram the controller 104 (or otherwise reducing the amount of required reprogramming) and/or otherwise rewire the system 100. As described above, the disclosed technologies provide a diagnostic tool set that facilitates offline configuration and testing to insure the appliance provides the desired monitoring and control without significant disruption of operations. The disclosed technologies also provide a factory reset to factory defaults for a clean restart of configuration if desired or required.

The invention claimed is:

1. A method for facilitating communication between a master programmable logic controller and a target drive, the method comprising:

configuring, by a remote device emulation appliance, one or more drive emulation parameters specified by a user, the one or more drive emulation parameters including a baud rate defined by the user;

receiving, by the remote device emulation appliance, a first communication from the master programmable logic controller over a remote input/output communication link, wherein the first communication is formatted according to a remote input/output protocol unusable by the target drive;

retrieving, by the remote device emulation appliance, communication conversion data associated with a legacy drive, the communication conversion data defining rules for converting a communication including a status word from a format usable by the legacy drive to a format usable by the target drive;

converting, by the remote device emulation appliance and as a function of the communication conversion data and of the configured one or more drive emulation parameters, the first communication from the remote input/output protocol to a drive protocol usable by the target drive, wherein converting the first communication comprises converting, by the remote device emulation appliance, a format of the status word included in the first communication from the format usable by the legacy drive to the format usable by the target drive; and transmitting, by the remote device emulation appliance, the converted communication to the target drive to control an operation of the target drive.

2. The method of claim 1, wherein the remote input/output protocol is configured for use by the legacy drive.

3. The method of claim 1, wherein converting the first communication further comprises converting, by the remote device emulation appliance, a format of a control word included in the first communication from the format usable by the legacy drive to the format usable by the target drive.

4. The method of claim 1, wherein converting the first communication further comprises converting, by the remote device emulation appliance, drive operational parameters included in the first communication from the format usable by the legacy drive to the format usable by the target drive.

5. The method of claim 1, further comprising:
receiving, by the remote device emulation appliance, a second communication from the target drive in response to the first converted communication, wherein the second communication is formatted according to the drive protocol;
converting, by the remote device emulation appliance, the second communication from the drive protocol to the remote input/output protocol; and
transmitting the converted second communication to the master programmable logic controller.

6. The method of claim 5, wherein converting the second communication comprises converting, by the remote device emulation appliance, a format of a status word included in the second communication from the format usable by the target drive to the format usable by the legacy drive.

7. The method of claim 1, further comprising:
receiving, by the remote device emulation appliance, a selection of a type of the target drive;
receiving, by the remote device emulation appliance, configuration data from a user of the remote device emulation appliance, the configuration data comprising settings for drive operational parameters of the target drive;
setting, by the remote device emulation appliance, the drive operational parameters of the target drive based on the received configuration data;
determining, by the remote device emulation appliance, whether each of the set drive operational parameters is valid; and
visually identifying a first drive operational parameter of the set drive operational parameters in response to a determination that the first drive operational parameter is invalid.

8. The method of claim 1, further comprising:
receiving, by the remote device emulation appliance, a selection of the legacy drive to be emulated by the target drive.

9. A remote device emulation appliance for facilitating communication between a master programmable logic controller and a drive, the remote device emulation appliance comprising:
a configuration circuit configured to configure one or more drive emulation parameters specified by a user, the one or more drive emulation parameters including a baud rate defined by the user;
a communication circuit configured to receive a first communication from the master programmable logic controller over a remote input/output communication link, wherein the first communication is formatted according to a remote input/output protocol unusable by the target drive;
an initialization circuit configured to retrieve communication conversion data associated with a legacy drive, the communication conversion data defining rules for converting a communication including a status word from a format usable by the legacy drive to a format usable by the target drive; and
a communication conversion circuit configured to convert, as a function of the communication conversion data and of the configured one or more drive emulation parameters, the first communication from the remote input/output protocol to a drive protocol usable by the target drive, wherein to convert the first communication comprises to convert a format of the status word included in the first communication from the format usable by the legacy drive to the format usable by the target drive,
wherein the communication circuit is further configured to transmit the converted communication to the target drive to control an operation of the target drive.

10. The remote device emulation appliance of claim 9, wherein the remote input/output protocol is configured for use by the legacy drive.

11. The remote device emulation appliance of claim 9, wherein to convert the first communication further comprises to convert a format of a control word included in the first communication from the format usable by the legacy drive to the format usable by the target drive.

12. The remote device emulation appliance of claim 9, wherein to convert the first communication further comprises to convert drive operational parameters included in the first communication from the format usable by the legacy drive to the format usable by the target drive.

13. The remote device emulation appliance of claim 9, wherein:
the communication circuit is configured to receive a second communication from the target drive in response to the first converted communication, wherein the second communication is formatted according to the drive protocol,
the communication conversion circuit is configured to convert the second communication from the drive protocol to the remote input/output protocol, and
the communication circuit is further configured to transmit the converted second communication to the master programmable logic controller.

14. The remote device emulation appliance of claim 13, wherein to convert the second communication comprises to convert a format of a status word included in the second communication from the format usable by the target drive to the format usable by the legacy drive.

15. The remote device emulation appliance of claim 13, further comprising validation circuit,
wherein the initialization circuit is configured to:
receive a selection of a type of the target drive;
receive configuration data from a user of the remote device emulation appliance, the configuration data comprising settings for drive operational parameters of the target drive; and
set the drive operational parameters of the target drive based on the received configuration data, and
wherein the validation circuit is configured to:
determine whether each of the set drive operational parameters is valid, and
visually identify a first drive operational parameter of the set drive operational parameters in response to a determination that the first drive operational parameter is invalid.

16. The remote device emulation appliance of claim 13, wherein the initialization circuit is further configured to:
receive a selection of the legacy drive to be emulated by the target drive.

17. One or more non-transitory, machine-readable storage media comprising a plurality of instructions stored thereon that, in response to execution, cause a remote device emulation appliance to:
configure one or more drive emulation parameters specified by a user, the one or more drive emulation parameters including a baud rate defined by the user;
receive a first communication from a master programmable logic controller over a remote input/output communication link, wherein the first communication is formatted according to a remote input/output protocol unusable by the target drive;

retrieve communication conversion data associated with a legacy drive, the communication conversion data defining rules for converting a communication including at least one of a control word or a status word from a format usable by the legacy drive to a format usable by the target drive;

convert, as a function of the communication conversion data and of the configured one or more drive emulation parameters, the first communication from the remote input/output protocol to a drive protocol usable by the target drive, wherein to convert the first communication comprises to convert the format of the status word included in the first communication from the format usable by the legacy drive to the format usable by the target drive; and transmit the converted communication to the target drive to control an operation of the target drive.

18. The one or more non-transitory, machine-readable storage media of claim 17, wherein the remote input/output protocol is configured for use by the legacy drive.

19. The one or more non-transitory, machine-readable storage media of claim 17, wherein to convert the first communication further comprises to convert a format of a control word included in the first communication from the format usable by the legacy drive to the format usable by the target drive.

20. The one or more non-transitory, machine-readable storage media of claim 17, wherein to convert the first communication further comprises to convert drive operational parameters included in the first communication from the format usable by the legacy drive to the format usable by the target drive.

21. The one or more non-transitory, machine-readable storage media of claim 17, wherein the plurality of instructions further cause the remote device emulation appliance to:

receive a second communication from the target drive in response to the first converted communication, wherein the second communication is formatted according to the drive protocol, convert the second communication from the drive protocol to the remote input/output protocol, and transmit the converted second communication to the master programmable logic controller.

22. The one or more non-transitory, machine-readable storage media of claim 21, wherein to convert the second communication comprises to convert a format of a status word included in the second communication from the format usable by the target drive to the format usable by the legacy drive.

23. The one or more non-transitory, machine-readable storage media of claim 17, wherein the plurality of instructions further cause the remote device emulation appliance to:

receive a selection of a type of the target drive;

receive configuration data from a user of the remote device emulation appliance, the configuration data comprising settings for drive operational parameters of the target drive;

set the drive operational parameters of the target drive based on the received configuration data;

determine whether each of the set drive operational parameters is valid; and visually identify a first drive operational parameter of the set drive operational parameters in response to a determination that the first drive operational parameter is invalid.

24. The one or more non-transitory, machine-readable storage media of claim 17, wherein the plurality of instructions further cause the remote device emulation appliance to:

receive a selection of the legacy drive to be emulated by the target drive.

* * * * *